US011967034B2

(12) United States Patent
Soon-Shiong

(10) Patent No.: US 11,967,034 B2
(45) Date of Patent: Apr. 23, 2024

(54) AUGMENTED REALITY OBJECT MANAGEMENT SYSTEM

(71) Applicant: Nant Holdings IP, LLC, Culver City, CA (US)

(72) Inventor: Patrick Soon-Shiong, Los Angeles, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

(21) Appl. No.: 18/385,800

(22) Filed: Oct. 31, 2023

(65) Prior Publication Data

US 2024/0062486 A1 Feb. 22, 2024

Related U.S. Application Data

(60) Continuation of application No. 18/206,976, filed on Jun. 7, 2023, now Pat. No. 11,854,153, which is a
(Continued)

(51) Int. Cl.
*G06T 19/00* (2011.01)
*A63F 13/21* (2014.01)
(Continued)

(52) U.S. Cl.
CPC ............. *G06T 19/006* (2013.01); *A63F 13/21* (2014.09); *A63F 13/212* (2014.09); *A63F 13/32* (2014.09);
(Continued)

(58) Field of Classification Search
CPC ................. G06T 19/006; G06T 15/005; G06T 2219/016; A63F 13/21; A63F 13/00;
(Continued)

(56) References Cited

U.S. PATENT DOCUMENTS 3,050,870 A 8/1962 Heilig
5,255,211 A 10/1993 Redmond
(Continued)

FOREIGN PATENT DOCUMENTS

CA 2 311 319 C 6/1999
CA 2235030 A1 8/1999
(Continued)

OTHER PUBLICATIONS

Lin, "How is Nike+ Heat Map Calculated?," howtonike.blogspot. com/2012/06/how-is-nike-heat-map-calculated.html, 4 pages.
(Continued)

*Primary Examiner* — Wesner Sajous
(74) *Attorney, Agent, or Firm* — MASCHOFF BRENNAN; Andrew Noble; Elaine K. Lee

(57) ABSTRACT

Interference-based augmented reality hosting platforms are presented. Hosting platforms can include networking nodes capable of analyzing a digital representation of scene to derive interference among elements of the scene. The hosting platform utilizes the interference to adjust the presence of augmented reality objects within an augmented reality experience. Elements of a scene can constructively interfere, enhancing presence of augmented reality objects; or destructively interfere, suppressing presence of augmented reality objects.

21 Claims, 6 Drawing Sheets

Related U.S. Application Data continuation of application No. 17/972,504, filed on Oct. 24, 2022, now Pat. No. 11,830,158, which is a continuation of application No. 17/386,410, filed on Jul. 27, 2021, now Pat. No. 11,514,652, which is a continuation of application No. 16/926,485, filed on Jul. 10, 2020, now Pat. No. 11,107,289, which is a continuation of application No. 16/557,963, filed on Aug. 30, 2019, now Pat. No. 10,726,632, which is a continuation of application No. 16/186,405, filed on Nov. 9, 2018, now Pat. No. 10,403,051, which is a continuation of application No. 15/786,242, filed on Oct. 17, 2017, now Pat. No. 10,127,733, which is a continuation of application No. 15/213,113, filed on Jul. 18, 2016, now Pat. No. 9,824,501, which is a continuation of application No. 14/329,882, filed on Jul. 11, 2014, now Pat. No. 9,396,589, which is a division of application No. 13/173,244, filed on Jun. 30, 2011, now Pat. No. 8,810,598.

(60) Provisional application No. 61/473,324, filed on Apr. 8, 2011.

(51) Int. Cl.
| | | |
|---|---|---|
| *A63F 13/212* | (2014.01) | |
| *A63F 13/32* | (2014.01) | |
| *A63F 13/335* | (2014.01) | |
| *A63F 13/65* | (2014.01) | |
| *G06F 16/00* | (2019.01) | |
| *G06F 16/953* | (2019.01) | |
| *G06F 16/9537* | (2019.01) | |
| *G06V 10/20* | (2022.01) | |
| *G09G 5/00* | (2006.01) | |

(52) U.S. Cl.
CPC ............ *A63F 13/335* (2014.09); *A63F 13/65* (2014.09); *G06F 16/00* (2019.01); *G06F 16/9537* (2019.01); *G09G 5/00* (2013.01); *H05K 999/99* (2013.01); *G06T 2219/016* (2013.01)

(58) Field of Classification Search
CPC .... A63F 13/212; A63F 13/335; A63F 13/323; A63F 13/327; A63F 13/332; A63F 13/65; G06F 17/3087; G06F 16/9537; G06F 16/00; H05K 999/99; H04L 29/06; H04L 29/08072; G09G 5/00; G06V 10/00; G06V 10/20; G06V 10/22–24; G06V 10/248; G06V 10/462; G06V 20/20; G06V 20/38; G06V 20/50; G06V 30/10; G06V 30/18; G06V 30/18143; G06V 30/19

See application file for complete search history.

(56) References Cited

U.S. PATENT DOCUMENTS

| | | |
|---|---|---|
| 5,446,833 A | 8/1995 | Miller et al. |
| 5,625,765 A | 4/1997 | Ellenby et al. |
| 5,682,332 A | 10/1997 | Ellenby et al. |
| 5,742,521 A | 4/1998 | Ellenby et al. |
| 5,748,194 A | 5/1998 | Chen |
| 5,751,576 A | 5/1998 | Monson |
| 5,759,044 A | 6/1998 | Redmond |
| 5,815,411 A | 9/1998 | Ellenby et al. |
| 5,848,373 A | 12/1998 | DeLorme et al. |
| 5,884,029 A | 3/1999 | Brush, II et al. |
| 5,991,827 A | 11/1999 | Ellenby et al. |
| 6,031,545 A | 2/2000 | Ellenby et al. |
| 6,037,936 A | 3/2000 | Ellenby et al. |
| 6,052,125 A | 4/2000 | Gardiner et al. |
| 6,064,398 A | 5/2000 | Ellenby et al. |
| 6,064,749 A | 5/2000 | Hirota et al. |
| 6,081,278 A | 6/2000 | Chen |
| 6,092,107 A | 7/2000 | Eleftheriadis et al. |
| 6,097,393 A | 8/2000 | Prouty, IV et al. |
| 6,098,118 A | 8/2000 | Ellenby et al. |
| 6,130,673 A | 10/2000 | Pulli et al. |
| 6,161,126 A | 12/2000 | Wies et al. |
| 6,169,545 B1 | 1/2001 | Gallery et al. |
| 6,173,239 B1 | 1/2001 | Ellenby |
| 6,215,498 B1 | 4/2001 | Filo et al. |
| 6,226,669 B1 | 5/2001 | Huang et al. |
| 6,240,360 B1 | 5/2001 | Phelan |
| 6,242,944 B1 | 6/2001 | Benedetti et al. |
| 6,256,043 B1 | 7/2001 | Aho et al. |
| 6,278,461 B1 | 8/2001 | Ellenby et al. |
| 6,307,556 B1 | 10/2001 | Ellenby et al. |
| 6,308,565 B1 | 10/2001 | French et al. |
| 6,336,098 B1 | 1/2002 | Fortenberry et al. |
| 6,339,745 B1 | 1/2002 | Novik et al. |
| 6,346,938 B1 | 2/2002 | Chan et al. |
| 6,396,475 B1 | 5/2002 | Ellenby et al. |
| 6,414,696 B1 | 7/2002 | Ellenby et al. |
| 6,512,844 B2 | 1/2003 | Bouguet et al. |
| 6,522,292 B1 | 2/2003 | Ellenby et al. |
| 6,529,331 B2 | 3/2003 | Massof et al. |
| 6,535,210 B1 | 3/2003 | Ellenby et al. |
| 6,552,729 B1 | 4/2003 | Bernardo et al. |
| 6,552,744 B2 | 4/2003 | Chen |
| 6,553,310 B1 | 4/2003 | Lopke |
| 6,557,041 B2 | 4/2003 | Mallart |
| 6,559,813 B1 | 5/2003 | DeLuca et al. |
| 6,563,489 B1 | 5/2003 | Latypov et al. |
| 6,563,529 B1 | 5/2003 | Jongerius |
| 6,577,714 B1 | 6/2003 | Darcie et al. |
| 6,631,403 B1 | 10/2003 | Deutsch et al. |
| 6,672,961 B1 | 1/2004 | Uzun |
| 6,690,370 B2 | 2/2004 | Ellenby et al. |
| 6,691,032 B1 | 2/2004 | Irish et al. |
| 6,746,332 B1 | 6/2004 | Ing et al. |
| 6,751,655 B1 | 6/2004 | Deutsch et al. |
| 6,757,068 B2 | 6/2004 | Foxlin |
| 6,767,287 B1 | 7/2004 | Mcquaid et al. |
| 6,768,509 B1 | 7/2004 | Bradski et al. |
| 6,774,869 B2 | 8/2004 | Biocca et al. |
| 6,785,667 B2 | 8/2004 | Orbanes et al. |
| 6,804,726 B1 | 10/2004 | Ellenby et al. |
| 6,822,648 B2 | 11/2004 | Furlong et al. |
| 6,853,398 B2 | 2/2005 | Malzbender et al. |
| 6,854,012 B1 | 2/2005 | Taylor |
| 6,882,933 B2 | 4/2005 | Kondou et al. |
| 6,922,155 B1 | 7/2005 | Evans et al. |
| 6,930,715 B1 | 8/2005 | Mower |
| 6,965,371 B1 | 11/2005 | MacLean et al. |
| 6,968,973 B2 | 11/2005 | Uyttendaele et al. |
| 7,016,532 B2 | 3/2006 | Boncyk et al. |
| 7,031,875 B2 | 4/2006 | Ellenby et al. |
| 7,073,129 B1 | 7/2006 | Robarts et al. |
| 7,076,505 B2 | 7/2006 | Campbell |
| 7,113,618 B2 | 9/2006 | Junkins et al. |
| 7,116,326 B2 | 10/2006 | Soulchin et al. |
| 7,116,342 B2 | 10/2006 | Dengler et al. |
| 7,142,209 B2 | 11/2006 | Uyttendaele et al. |
| 7,143,258 B2 | 11/2006 | Bae |
| 7,168,042 B2 | 1/2007 | Braun et al. |
| 7,174,301 B2 | 2/2007 | Florance et al. |
| 7,206,000 B2 | 4/2007 | Zitnick, III et al. |
| 7,245,273 B2 | 7/2007 | Eberl et al. |
| 7,269,425 B2 | 9/2007 | Valkóet al. |
| 7,271,795 B2 | 9/2007 | Bradski |
| 7,274,380 B2 | 9/2007 | Navab et al. |
| 7,280,697 B2 | 10/2007 | Perona et al. |
| 7,301,536 B2 | 11/2007 | Ellenby et al. |
| 7,353,114 B1 | 4/2008 | Rohlf et al. |
| 7,369,668 B1 | 5/2008 | Huopaniemi et al. |
| 7,395,507 B2 | 7/2008 | Robarts et al. |
| 7,406,421 B2 | 7/2008 | Odinak et al. |

(56) References Cited

U.S. PATENT DOCUMENTS

| | | |
|---|---|---|
| 7,412,427 B2 | 8/2008 | Zitnick et al. |
| 7,454,361 B1 | 11/2008 | Halavais et al. |
| 7,477,780 B2 | 1/2009 | Boncyk et al. |
| 7,511,736 B2 | 3/2009 | Benton |
| 7,529,639 B2 | 5/2009 | Rasanen et al. |
| 7,532,224 B2 | 5/2009 | Bannai |
| 7,564,469 B2 | 7/2009 | Cohen |
| 7,565,008 B2 | 7/2009 | Boncyk et al. |
| 7,641,342 B2 | 1/2010 | Eberl et al. |
| 7,650,616 B2 | 1/2010 | Lee |
| 7,680,324 B2 | 3/2010 | Boncyk et al. |
| 7,696,905 B2 | 4/2010 | Ellenby et al. |
| 7,710,395 B2 | 5/2010 | Rodgers et al. |
| 7,714,895 B2 | 5/2010 | Pretlove et al. |
| 7,729,946 B2 | 6/2010 | Chu |
| 7,734,412 B2 | 6/2010 | Shi et al. |
| 7,768,534 B2 | 8/2010 | Pentenrieder et al. |
| 7,774,180 B2 | 8/2010 | Joussemet et al. |
| 7,796,155 B1 | 9/2010 | Neely, III et al. |
| 7,817,104 B2 | 10/2010 | Ryu et al. |
| 7,822,539 B2 | 10/2010 | Akiyoshi et al. |
| 7,828,655 B2 | 11/2010 | Uhlir et al. |
| 7,844,229 B2 | 11/2010 | Gyorfi et al. |
| 7,847,699 B2 | 12/2010 | Lee et al. |
| 7,847,808 B2 | 12/2010 | Cheng et al. |
| 7,887,421 B2 | 2/2011 | Tabata |
| 7,889,193 B2 | 2/2011 | Platonov et al. |
| 7,899,915 B2 | 3/2011 | Reisman |
| 7,904,577 B2 | 3/2011 | Taylor |
| 7,907,128 B2 | 3/2011 | Bathiche et al. |
| 7,908,462 B2 | 3/2011 | Sung |
| 7,916,138 B2 | 3/2011 | John et al. |
| 7,962,281 B2 | 6/2011 | Rasmussen et al. |
| 7,978,207 B1 | 7/2011 | Herf et al. |
| 8,046,408 B2 | 10/2011 | Torabi |
| 8,118,297 B2 | 2/2012 | Izumichi |
| 8,130,242 B2 | 3/2012 | Cohen |
| 8,130,260 B2 | 3/2012 | Krill et al. |
| 8,160,994 B2 | 4/2012 | Ong et al. |
| 8,170,222 B2 | 5/2012 | Dunko |
| 8,189,959 B2 | 5/2012 | Szeliski et al. |
| 8,190,749 B1 | 5/2012 | Chi et al. |
| 8,204,299 B2 | 6/2012 | Arcas et al. |
| 8,218,873 B2 | 7/2012 | Boncyk et al. |
| 8,223,024 B1 | 7/2012 | Petrou et al. |
| 8,223,088 B1 | 7/2012 | Gomez et al. |
| 8,224,077 B2 | 7/2012 | Boncyk et al. |
| 8,224,078 B2 | 7/2012 | Boncyk et al. |
| 8,246,467 B2 | 8/2012 | Huang et al. |
| 8,251,819 B2 | 8/2012 | Watkins, Jr. et al. |
| 8,291,346 B2 | 10/2012 | Kerr et al. |
| 8,315,432 B2 | 11/2012 | Lefevre et al. |
| 8,321,527 B2 | 11/2012 | Martin et al. |
| 8,374,395 B2 | 2/2013 | Lefevre et al. |
| 8,417,261 B2 | 4/2013 | Huston et al. |
| 8,427,508 B2 | 4/2013 | Mattila et al. |
| 8,438,110 B2 | 5/2013 | Calman et al. |
| 8,472,972 B2 | 6/2013 | Nadler et al. |
| 8,488,011 B2 | 7/2013 | Blanchflower et al. |
| 8,489,993 B2 | 7/2013 | Tamura et al. |
| 8,498,814 B2 | 7/2013 | Irish et al. |
| 8,502,835 B1 | 8/2013 | Meehan |
| 8,509,483 B2 | 8/2013 | Inigo |
| 8,519,844 B2 | 8/2013 | Richey et al. |
| 8,527,340 B2 | 9/2013 | Fisher et al. |
| 8,531,449 B2 | 9/2013 | Lynch et al. |
| 8,537,113 B2 | 9/2013 | Weising et al. |
| 8,558,759 B1 | 10/2013 | Gomez et al. |
| 8,576,276 B2 | 11/2013 | Bar-Zeev et al. |
| 8,576,756 B2 | 11/2013 | Ko et al. |
| 8,585,476 B2 | 11/2013 | Mullen et al. |
| 8,605,141 B2 | 12/2013 | Dialameh et al. |
| 8,606,657 B2 | 12/2013 | Chesnut et al. |
| 8,633,946 B2 | 1/2014 | Cohen |
| 8,645,220 B2 | 2/2014 | Harper et al. |
| 8,660,369 B2 | 2/2014 | Llano et al. |
| 8,660,951 B2 | 2/2014 | Calman et al. |
| 8,675,017 B2 | 3/2014 | Rose et al. |
| 8,686,924 B2 | 4/2014 | Braun et al. |
| 8,700,060 B2 | 4/2014 | Huang |
| 8,706,170 B2 | 4/2014 | Jacobsen et al. |
| 8,706,399 B2 | 4/2014 | Irish et al. |
| 8,711,176 B2 | 4/2014 | Douris et al. |
| 8,727,887 B2 | 5/2014 | Mahajan et al. |
| 8,730,156 B2 | 5/2014 | Weising et al. |
| 8,743,145 B1 | 6/2014 | Price et al. |
| 8,743,244 B2 | 6/2014 | Vartanian et al. |
| 8,744,214 B2 | 6/2014 | Snavely et al. |
| 8,745,494 B2 | 6/2014 | Spivack |
| 8,751,159 B2 | 6/2014 | Hall |
| 8,754,907 B2 | 6/2014 | Tseng |
| 8,762,047 B2 | 6/2014 | Sterkel et al. |
| 8,764,563 B2 | 7/2014 | Toyoda |
| 8,786,675 B2 | 7/2014 | Deering et al. |
| 8,803,917 B2 | 8/2014 | Meehan |
| 8,810,598 B2 * | 8/2014 | Soon-Shiong .......... G06F 16/00 345/632 |
| 8,814,691 B2 | 8/2014 | Haddick et al. |
| 8,855,719 B2 | 10/2014 | Jacobsen et al. |
| 8,872,851 B2 | 10/2014 | Choubassi et al. |
| 8,893,164 B1 | 11/2014 | Teller |
| 8,913,085 B2 | 12/2014 | Anderson et al. |
| 8,933,841 B2 | 1/2015 | Valaee et al. |
| 8,938,464 B2 | 1/2015 | Bailly et al. |
| 8,958,979 B1 | 2/2015 | Levine et al. |
| 8,965,741 B2 | 2/2015 | McCulloch et al. |
| 8,968,099 B1 | 3/2015 | Hanke et al. |
| 8,994,645 B1 | 3/2015 | Meehan |
| 9,001,252 B2 | 4/2015 | Hannaford |
| 9,007,364 B2 | 4/2015 | Bailey |
| 9,024,842 B1 | 5/2015 | Gomez et al. |
| 9,024,972 B1 | 5/2015 | Bronder et al. |
| 9,037,468 B2 | 5/2015 | Osman |
| 9,041,739 B2 | 5/2015 | Latta et al. |
| 9,047,609 B2 | 6/2015 | Ellis et al. |
| 9,071,709 B2 | 6/2015 | Wither et al. |
| 9,098,905 B2 | 8/2015 | Rivlin et al. |
| 9,122,053 B2 | 9/2015 | Geisner et al. |
| 9,122,321 B2 | 9/2015 | Perez et al. |
| 9,122,368 B2 | 9/2015 | Szeliski et al. |
| 9,122,707 B2 | 9/2015 | Wither et al. |
| 9,128,520 B2 | 9/2015 | Geisner et al. |
| 9,129,644 B2 | 9/2015 | Gay et al. |
| 9,131,208 B2 | 9/2015 | Jin |
| 9,143,839 B2 | 9/2015 | Reisman et al. |
| 9,167,386 B2 | 10/2015 | Valaee et al. |
| 9,177,381 B2 | 11/2015 | McKinnon |
| 9,178,953 B2 | 11/2015 | Theimer et al. |
| 9,182,815 B2 | 11/2015 | Small et al. |
| 9,183,560 B2 | 11/2015 | Abelow |
| 9,230,367 B2 | 1/2016 | Stroila |
| 9,240,074 B2 | 1/2016 | Berkovich et al. |
| 9,245,387 B2 | 1/2016 | Poulos et al. |
| 9,262,743 B2 | 2/2016 | Heins et al. |
| 9,264,515 B2 | 2/2016 | Ganapathy et al. |
| 9,280,258 B1 | 3/2016 | Bailly et al. |
| 9,311,397 B2 | 4/2016 | Meadow et al. |
| 9,317,133 B2 | 4/2016 | Korah et al. |
| 9,345,957 B2 | 5/2016 | Geisner et al. |
| 9,377,862 B2 | 6/2016 | Parkinson et al. |
| 9,384,737 B2 | 7/2016 | Lamb et al. |
| 9,389,090 B1 | 7/2016 | Levine et al. |
| 9,396,589 B2 * | 7/2016 | Soon-Shiong ........ A63F 13/212 |
| 9,466,144 B2 | 10/2016 | Sharp et al. |
| 9,480,913 B2 | 11/2016 | Briggs |
| 9,482,528 B2 | 11/2016 | Baker et al. |
| 9,495,591 B2 | 11/2016 | Visser et al. |
| 9,495,760 B2 | 11/2016 | Swaminathan et al. |
| 9,498,720 B2 | 11/2016 | Geisner et al. |
| 9,503,310 B1 | 11/2016 | Hawkes et al. |
| 9,536,251 B2 | 1/2017 | Huang et al. |
| 9,552,673 B2 | 1/2017 | Hilliges et al. |
| 9,558,557 B2 | 1/2017 | Jiang et al. |
| 9,573,064 B2 | 2/2017 | Kinnebrew et al. |

(56) References Cited

U.S. PATENT DOCUMENTS

| | | |
|---|---|---|
| 9,582,516 B2 | 2/2017 | McKinnon et al. |
| 9,602,859 B2 | 3/2017 | Strong |
| 9,662,582 B2 | 5/2017 | Mullen |
| 9,678,654 B2 | 6/2017 | Wong et al. |
| 9,782,668 B1 | 10/2017 | Golden et al. |
| 9,805,385 B2 | 10/2017 | Soon-Shiong |
| 9,817,848 B2 | 11/2017 | McKinnon et al. |
| 9,824,501 B2 * | 11/2017 | Soon-Shiong .......... A63F 13/32 |
| 9,891,435 B2 | 2/2018 | Boger et al. |
| 9,942,420 B2 | 4/2018 | Rao et al. |
| 9,972,208 B2 | 5/2018 | Levine et al. |
| 10,002,337 B2 | 6/2018 | Siddique et al. |
| 10,062,213 B2 | 8/2018 | Mount et al. |
| 10,068,381 B2 | 9/2018 | Blanchflower et al. |
| 10,115,122 B2 | 10/2018 | Soon-Shiong |
| 10,127,733 B2 * | 11/2018 | Soon-Shiong .......... A63F 13/32 |
| 10,133,342 B2 | 11/2018 | Mittal et al. |
| 10,140,317 B2 | 11/2018 | McKinnon et al. |
| 10,147,113 B2 | 12/2018 | Soon-Shiong |
| 10,217,284 B2 | 2/2019 | Das et al. |
| 10,304,073 B2 | 5/2019 | Soon-Shiong |
| 10,339,717 B2 | 7/2019 | Weisman et al. |
| 10,403,051 B2 * | 9/2019 | Soon-Shiong ........ A63F 13/212 |
| 10,509,461 B2 | 12/2019 | Mullen |
| 10,565,828 B2 | 2/2020 | Amaitis et al. |
| 10,614,477 B2 | 4/2020 | Soon-Shiong |
| 10,664,518 B2 | 5/2020 | McKinnon et al. |
| 10,675,543 B2 | 6/2020 | Reiche, III |
| 10,726,632 B2 * | 7/2020 | Soon-Shiong .......... A63F 13/65 |
| 10,828,559 B2 | 11/2020 | Mullen |
| 10,838,485 B2 | 11/2020 | Mullen |
| 11,004,102 B2 | 5/2021 | Soon-Shiong |
| 11,107,289 B2 | 8/2021 | Soon-Shiong |
| 11,263,822 B2 * | 3/2022 | Weisman .............. A63F 13/847 |
| 11,270,114 B2 * | 3/2022 | Park ................... G02B 27/0081 |
| 11,514,652 B2 | 11/2022 | Soon-Shiong |
| 11,521,226 B2 | 12/2022 | Soon-Shiong |
| 11,645,668 B2 | 5/2023 | Soon-Shiong |
| 11,854,036 B2 | 12/2023 | Soon-Shiong |
| 11,854,153 B2 | 12/2023 | Soon-Shiong |
| 11,869,160 B2 | 1/2024 | Soon-Shiong |
| 2001/0045978 A1 | 11/2001 | McConnell et al. |
| 2002/0044152 A1 | 4/2002 | Abbott, III et al. |
| 2002/0077905 A1 | 6/2002 | Arndt et al. |
| 2002/0080167 A1 | 6/2002 | Andrews et al. |
| 2002/0086669 A1 | 7/2002 | Bos et al. |
| 2002/0107634 A1 | 8/2002 | Luciani |
| 2002/0133291 A1 | 9/2002 | Hamada et al. |
| 2002/0138607 A1 | 9/2002 | Rourke et al. |
| 2002/0158873 A1 | 10/2002 | Williamson |
| 2002/0163521 A1 | 11/2002 | Ellenby et al. |
| 2003/0008619 A1 | 1/2003 | Werner |
| 2003/0027634 A1 | 2/2003 | Matthews, III |
| 2003/0060211 A1 | 3/2003 | Chern et al. |
| 2003/0069693 A1 | 4/2003 | Snapp et al. |
| 2003/0177187 A1 | 9/2003 | Levine et al. |
| 2003/0195022 A1 | 10/2003 | Lynch et al. |
| 2003/0212996 A1 | 11/2003 | Wolzien |
| 2003/0224855 A1 | 12/2003 | Cunningham |
| 2003/0234859 A1 | 12/2003 | Malzbender et al. |
| 2004/0002843 A1 | 1/2004 | Robarts et al. |
| 2004/0058732 A1 | 3/2004 | Piccionelli |
| 2004/0104935 A1 | 6/2004 | Williamson et al. |
| 2004/0110565 A1 | 6/2004 | Levesque |
| 2004/0164897 A1 | 8/2004 | Treadwell et al. |
| 2004/0193441 A1 | 9/2004 | Altieri |
| 2004/0203380 A1 | 10/2004 | Hamdi et al. |
| 2004/0221053 A1 | 11/2004 | Codella et al. |
| 2004/0223190 A1 | 11/2004 | Oka |
| 2004/0246333 A1 | 12/2004 | Steuart, III |
| 2004/0248653 A1 | 12/2004 | Barros et al. |
| 2005/0004753 A1 | 1/2005 | Weiland et al. |
| 2005/0024501 A1 | 2/2005 | Ellenby et al. |
| 2005/0043097 A1 | 2/2005 | March et al. |
| 2005/0047647 A1 | 3/2005 | Rutishauser et al. |
| 2005/0049022 A1 | 3/2005 | Mullen |
| 2005/0060377 A1 | 3/2005 | Lo et al. |
| 2005/0143172 A1 | 6/2005 | Kurzweil |
| 2005/0192025 A1 | 9/2005 | Kaplan |
| 2005/0197767 A1 | 9/2005 | Nortrup |
| 2005/0202877 A1 | 9/2005 | Uhlir et al. |
| 2005/0208457 A1 | 9/2005 | Fink et al. |
| 2005/0223031 A1 | 10/2005 | Zisserman et al. |
| 2005/0285878 A1 | 12/2005 | Singh et al. |
| 2005/0289590 A1 | 12/2005 | Cheok et al. |
| 2006/0010256 A1 | 1/2006 | Heron et al. |
| 2006/0025229 A1 | 2/2006 | Mahajan et al. |
| 2006/0038833 A1 | 2/2006 | Mallinson et al. |
| 2006/0047704 A1 * | 3/2006 | Gopalakrishnan ...... G06F 16/51 |
| | | 707/E17.031 |
| 2006/0105838 A1 | 5/2006 | Mullen |
| 2006/0160619 A1 | 7/2006 | Skoglund |
| 2006/0161379 A1 | 7/2006 | Ellenby et al. |
| 2006/0166740 A1 | 7/2006 | Sufuentes |
| 2006/0190812 A1 | 8/2006 | Ellenby et al. |
| 2006/0223635 A1 | 10/2006 | Rosenberg |
| 2006/0223637 A1 | 10/2006 | Rosenberg |
| 2006/0249572 A1 | 11/2006 | Chen et al. |
| 2006/0259361 A1 | 11/2006 | Barhydt et al. |
| 2006/0262140 A1 | 11/2006 | Kujawa et al. |
| 2007/0035562 A1 | 2/2007 | Azuma et al. |
| 2007/0038944 A1 | 2/2007 | Carignano et al. |
| 2007/0060408 A1 | 3/2007 | Schultz et al. |
| 2007/0066358 A1 | 3/2007 | Silverbrook et al. |
| 2007/0070069 A1 | 3/2007 | Samarasekera et al. |
| 2007/0087828 A1 | 4/2007 | Robertson et al. |
| 2007/0099703 A1 | 5/2007 | Terebilo |
| 2007/0109619 A1 | 5/2007 | Eberl et al. |
| 2007/0146391 A1 | 6/2007 | Pentenrieder et al. |
| 2007/0167237 A1 | 7/2007 | Wang et al. |
| 2007/0173265 A1 | 7/2007 | Gum |
| 2007/0182739 A1 | 8/2007 | Platonov et al. |
| 2007/0265089 A1 | 11/2007 | Robarts et al. |
| 2007/0271301 A1 | 11/2007 | Klive |
| 2007/0288332 A1 | 12/2007 | Naito |
| 2008/0024594 A1 | 1/2008 | Ritchey |
| 2008/0030429 A1 | 2/2008 | Hailpern et al. |
| 2008/0071559 A1 | 3/2008 | Arrasvuori |
| 2008/0081638 A1 | 4/2008 | Boland et al. |
| 2008/0106489 A1 | 5/2008 | Brown et al. |
| 2008/0125218 A1 | 5/2008 | Collins et al. |
| 2008/0129528 A1 | 6/2008 | Guthrie |
| 2008/0132251 A1 | 6/2008 | Altman et al. |
| 2008/0147325 A1 | 6/2008 | Maassel et al. |
| 2008/0154538 A1 | 6/2008 | Stathis |
| 2008/0157946 A1 | 7/2008 | Eberl et al. |
| 2008/0198159 A1 | 8/2008 | Liu et al. |
| 2008/0198222 A1 | 8/2008 | Gowda |
| 2008/0211813 A1 | 9/2008 | Jamwal et al. |
| 2008/0261697 A1 | 10/2008 | Chatani et al. |
| 2008/0262910 A1 | 10/2008 | Altberg et al. |
| 2008/0268876 A1 | 10/2008 | Gelfand et al. |
| 2008/0291205 A1 | 11/2008 | Rasmussen et al. |
| 2008/0319656 A1 | 12/2008 | Irish |
| 2009/0003662 A1 | 1/2009 | Joseph et al. |
| 2009/0013052 A1 | 1/2009 | Robarts et al. |
| 2009/0037103 A1 | 2/2009 | Herbst et al. |
| 2009/0081959 A1 | 3/2009 | Gyorfi et al. |
| 2009/0102859 A1 | 4/2009 | Athsani et al. |
| 2009/0149250 A1 | 6/2009 | Middleton |
| 2009/0167787 A1 * | 7/2009 | Bathiche .............. G06T 19/006 |
| | | 345/633 |
| 2009/0167919 A1 | 7/2009 | Anttila et al. |
| 2009/0176509 A1 | 7/2009 | Davis et al. |
| 2009/0187389 A1 | 7/2009 | Dobbins et al. |
| 2009/0193055 A1 | 7/2009 | Kuberka et al. |
| 2009/0195650 A1 | 8/2009 | Hanai et al. |
| 2009/0209270 A1 | 8/2009 | Gutierrez et al. |
| 2009/0210486 A1 | 8/2009 | Lim |
| 2009/0213114 A1 | 8/2009 | Dobbins et al. |
| 2009/0219224 A1 | 9/2009 | Elg et al. |
| 2009/0222742 A1 | 9/2009 | Pelton et al. |
| 2009/0237546 A1 | 9/2009 | Bloebaum et al. |
| 2009/0248300 A1 | 10/2009 | Dunko et al. |

(56) References Cited

U.S. PATENT DOCUMENTS

| | | |
|---|---|---|
| 2009/0271160 A1 | 10/2009 | Copenhagen et al. |
| 2009/0271715 A1 | 10/2009 | Tumuluri |
| 2009/0284553 A1 | 11/2009 | Seydoux |
| 2009/0289956 A1 | 11/2009 | Douris et al. |
| 2009/0293012 A1 | 11/2009 | Alter et al. |
| 2009/0319902 A1 | 12/2009 | Kneller et al. |
| 2009/0322671 A1 | 12/2009 | Scott et al. |
| 2009/0325607 A1 | 12/2009 | Conway et al. |
| 2010/0008255 A1 | 1/2010 | Khosravy et al. |
| 2010/0023878 A1 | 1/2010 | Douris et al. |
| 2010/0045933 A1 | 2/2010 | Eberl et al. |
| 2010/0048242 A1 | 2/2010 | Rhoads et al. |
| 2010/0087250 A1 | 4/2010 | Chiu |
| 2010/0113157 A1 | 5/2010 | Chin et al. |
| 2010/0138294 A1 | 6/2010 | Bussmann et al. |
| 2010/0162149 A1 | 6/2010 | Sheleheda et al. |
| 2010/0188638 A1 | 7/2010 | Eberl et al. |
| 2010/0189309 A1 | 7/2010 | Rouzes et al. |
| 2010/0194782 A1 | 8/2010 | Gyorfi et al. |
| 2010/0208033 A1 | 8/2010 | Edge et al. |
| 2010/0211506 A1 | 8/2010 | Chang et al. |
| 2010/0217855 A1 | 8/2010 | Przybysz et al. |
| 2010/0246969 A1 | 9/2010 | Winder et al. |
| 2010/0257252 A1* | 10/2010 | Dougherty ............ G06V 10/95 709/217 |
| 2010/0287485 A1 | 11/2010 | Bertolami et al. |
| 2010/0302143 A1 | 12/2010 | Spivack |
| 2010/0309097 A1 | 12/2010 | Raviv et al. |
| 2010/0315418 A1 | 12/2010 | Woo |
| 2010/0321389 A1 | 12/2010 | Gay et al. |
| 2010/0321540 A1 | 12/2010 | Woo et al. |
| 2010/0325154 A1 | 12/2010 | Schloter et al. |
| 2011/0018903 A1 | 1/2011 | Lapstun et al. |
| 2011/0028220 A1 | 2/2011 | Reiche, III |
| 2011/0034176 A1 | 2/2011 | Lord et al. |
| 2011/0038634 A1 | 2/2011 | DeCusatis et al. |
| 2011/0039622 A1 | 2/2011 | Levenson et al. |
| 2011/0055049 A1 | 3/2011 | Harper et al. |
| 2011/0134108 A1 | 6/2011 | Hertenstein |
| 2011/0142016 A1 | 6/2011 | Chatterjee |
| 2011/0145051 A1 | 6/2011 | Paradise et al. |
| 2011/0148922 A1 | 6/2011 | Son et al. |
| 2011/0151955 A1 | 6/2011 | Nave |
| 2011/0153186 A1 | 6/2011 | Jakobson |
| 2011/0183754 A1 | 7/2011 | Alghamdi |
| 2011/0202460 A1 | 8/2011 | Buer et al. |
| 2011/0205242 A1 | 8/2011 | Friesen |
| 2011/0212762 A1 | 9/2011 | Ocko et al. |
| 2011/0216060 A1 | 9/2011 | Weising et al. |
| 2011/0221771 A1 | 9/2011 | Cramer et al. |
| 2011/0234631 A1 | 9/2011 | Kim et al. |
| 2011/0238751 A1 | 9/2011 | Belimpasakis et al. |
| 2011/0241976 A1 | 10/2011 | Boger et al. |
| 2011/0246276 A1 | 10/2011 | Peters et al. |
| 2011/0249122 A1 | 10/2011 | Tricoukes et al. |
| 2011/0279445 A1 | 11/2011 | Murphy et al. |
| 2011/0316880 A1 | 12/2011 | Ojala et al. |
| 2011/0319148 A1 | 12/2011 | Kinnebrew et al. |
| 2012/0019557 A1 | 1/2012 | Aronsson et al. |
| 2012/0050144 A1 | 3/2012 | Morlock |
| 2012/0050503 A1 | 3/2012 | Kraft |
| 2012/0092328 A1 | 4/2012 | Flaks et al. |
| 2012/0098859 A1 | 4/2012 | Lee et al. |
| 2012/0105473 A1 | 5/2012 | Bar-Zeev et al. |
| 2012/0105474 A1 | 5/2012 | Cudalbu et al. |
| 2012/0105475 A1 | 5/2012 | Tseng et al. |
| 2012/0109773 A1 | 5/2012 | Sipper et al. |
| 2012/0110477 A1 | 5/2012 | Gaume |
| 2012/0113141 A1 | 5/2012 | Zimmerman et al. |
| 2012/0116920 A1 | 5/2012 | Adhikari et al. |
| 2012/0122570 A1 | 5/2012 | Baronoff |
| 2012/0127062 A1 | 5/2012 | Bar-Zeev et al. |
| 2012/0127201 A1 | 5/2012 | Kim et al. |
| 2012/0127284 A1 | 5/2012 | Bar-Zeev et al. |
| 2012/0139817 A1 | 6/2012 | Freeman |
| 2012/0157210 A1 | 6/2012 | Hall |
| 2012/0162255 A1 | 6/2012 | Ganapathy et al. |
| 2012/0194547 A1 | 8/2012 | Johnson et al. |
| 2012/0206452 A1 | 8/2012 | Geisner et al. |
| 2012/0219181 A1 | 8/2012 | Tseng et al. |
| 2012/0226437 A1 | 9/2012 | Li et al. |
| 2012/0229625 A1 | 9/2012 | Calman et al. |
| 2012/0231424 A1 | 9/2012 | Calman et al. |
| 2012/0231891 A1 | 9/2012 | Watkins, Jr. et al. |
| 2012/0232968 A1 | 9/2012 | Calman et al. |
| 2012/0232976 A1 | 9/2012 | Calman et al. |
| 2012/0236025 A1 | 9/2012 | Jacobsen et al. |
| 2012/0244950 A1 | 9/2012 | Braun |
| 2012/0252359 A1 | 10/2012 | Adams et al. |
| 2012/0256917 A1 | 10/2012 | Lieberman et al. |
| 2012/0260538 A1 | 10/2012 | Schob et al. |
| 2012/0276997 A1 | 11/2012 | Chowdhary et al. |
| 2012/0287284 A1 | 11/2012 | Jacobsen et al. |
| 2012/0293506 A1 | 11/2012 | Vertucci et al. |
| 2012/0302129 A1 | 11/2012 | Persaud et al. |
| 2013/0021373 A1 | 1/2013 | Vaught et al. |
| 2013/0044042 A1 | 2/2013 | Olsson et al. |
| 2013/0044128 A1 | 2/2013 | Liu et al. |
| 2013/0050258 A1 | 2/2013 | Liu et al. |
| 2013/0050496 A1 | 2/2013 | Jeong |
| 2013/0064426 A1 | 3/2013 | Watkins, Jr. et al. |
| 2013/0073988 A1 | 3/2013 | Groten et al. |
| 2013/0076788 A1 | 3/2013 | Zvi |
| 2013/0124563 A1 | 5/2013 | CaveLie et al. |
| 2013/0128060 A1 | 5/2013 | Rhoads et al. |
| 2013/0141419 A1 | 6/2013 | Mount et al. |
| 2013/0147836 A1 | 6/2013 | Small et al. |
| 2013/0159096 A1 | 6/2013 | Santhanagopal et al. |
| 2013/0176202 A1 | 7/2013 | Gervautz |
| 2013/0178257 A1 | 7/2013 | Langseth |
| 2013/0236040 A1 | 9/2013 | Crawford et al. |
| 2013/0326364 A1 | 12/2013 | Latta et al. |
| 2013/0335405 A1 | 12/2013 | Scavezze et al. |
| 2013/0342572 A1 | 12/2013 | Poulos et al. |
| 2014/0002492 A1 | 1/2014 | Lamb et al. |
| 2014/0101608 A1 | 4/2014 | Ryskamp et al. |
| 2014/0161323 A1 | 6/2014 | Livyatan et al. |
| 2014/0168261 A1 | 6/2014 | Margolis et al. |
| 2014/0184749 A1 | 7/2014 | Hilliges et al. |
| 2014/0267234 A1 | 9/2014 | Hook et al. |
| 2014/0306866 A1 | 10/2014 | Miller et al. |
| 2015/0091941 A1 | 4/2015 | Das et al. |
| 2015/0172626 A1 | 6/2015 | Martini |
| 2015/0206349 A1 | 7/2015 | Rosenthal et al. |
| 2015/0288944 A1 | 10/2015 | Nistico et al. |
| 2016/0269712 A1 | 9/2016 | Ostrover et al. |
| 2016/0292924 A1 | 10/2016 | Balachandreswaran et al. |
| 2017/0045941 A1 | 2/2017 | Tokubo et al. |
| 2017/0087465 A1 | 3/2017 | Lyons et al. |
| 2017/0216099 A1 | 8/2017 | Saladino |
| 2018/0300822 A1 | 10/2018 | Papakipos et al. |
| 2020/0005547 A1 | 1/2020 | Soon-Shiong |
| 2020/0257721 A1 | 8/2020 | McKinnon et al. |
| 2021/0358223 A1 | 11/2021 | Soon-Shiong |
| 2022/0156314 A1 | 5/2022 | McKinnon et al. |
| 2023/0051746 A1 | 2/2023 | Soon-Shiong |

FOREIGN PATENT DOCUMENTS

| | | |
|---|---|---|
| CA | 2233047 C | 9/2000 |
| CN | 102436461 A | 5/2012 |
| CN | 102484730 A | 5/2012 |
| CN | 102509342 A | 6/2012 |
| CN | 102509348 A | 6/2012 |
| EP | 1 012 725 | 6/2000 |
| EP | 1 246 080 A2 | 10/2002 |
| EP | 1 354 260 | 10/2003 |
| EP | 1 119 798 B1 | 3/2005 |
| EP | 1 965 344 A1 | 9/2008 |
| EP | 2 207 113 A1 | 7/2010 |
| EP | 1 588 537 B1 | 8/2010 |
| JP | 2001-286674 A | 10/2001 |
| JP | 2002-056163 A | 2/2002 |
| JP | 2002-282553 A | 10/2002 |

(56) References Cited

FOREIGN PATENT DOCUMENTS

| | | |
|---|---|---|
| JP | 2002-346226 A | 12/2002 |
| JP | 2003-305276 A | 10/2003 |
| JP | 2003-337903 A | 11/2003 |
| JP | 2004-64398 A | 2/2004 |
| JP | 2004-078385 A | 3/2004 |
| JP | 2005-196494 A | 7/2005 |
| JP | 2005-215922 A | 8/2005 |
| JP | 2005-316977 A | 11/2005 |
| JP | 2006-085518 A | 3/2006 |
| JP | 2006-190099 A | 7/2006 |
| JP | 2006-280480 A | 10/2006 |
| JP | 2007-222640 A | 9/2007 |
| JP | 2010-102588 A | 5/2010 |
| JP | 2010-118019 A | 5/2010 |
| JP | 2010-224884 A | 10/2010 |
| JP | 2011-60254 A | 3/2011 |
| JP | 2011-153324 A | 8/2011 |
| JP | 2011-253324 A | 12/2011 |
| JP | 2012-014220 A | 1/2012 |
| KR | 2010-0124947 A | 11/2010 |
| KR | 10-1171264 B1 | 8/2012 |
| WO | 95/09411 A1 | 4/1995 |
| WO | 97/44737 A1 | 11/1997 |
| WO | 98/50884 A3 | 11/1998 |
| WO | 99/42946 A2 | 8/1999 |
| WO | 99/42947 A2 | 8/1999 |
| WO | 00/20929 A1 | 4/2000 |
| WO | 01/63487 A1 | 8/2001 |
| WO | 01/71282 A1 | 9/2001 |
| WO | 01/88679 A2 | 11/2001 |
| WO | 02/03091 A2 | 1/2002 |
| WO | 02/42921 A1 | 5/2002 |
| WO | 02/059716 A2 | 8/2002 |
| WO | 02/073818 A1 | 9/2002 |
| WO | 2007/140155 A2 | 12/2007 |
| WO | 2010/079876 A1 | 7/2010 |
| WO | 2010/138344 A2 | 12/2010 |
| WO | 2011/028720 A1 | 3/2011 |
| WO | 2011/084720 A2 | 7/2011 |
| WO | 2011/163063 A2 | 12/2011 |
| WO | 2012/082807 A2 | 6/2012 |
| WO | 2012164155 A1 | 12/2012 |
| WO | 2013/023705 A1 | 2/2013 |
| WO | 2014/108799 A2 | 7/2014 |

OTHER PUBLICATIONS

"Map your run with new Nike+ GPS App," Nike News, Sep. 7, 2010, 3 pages.
Savov, "App review: Nike+ GPS," https://www.engadget.com/2010-09-07-app-review-nike-gps.html, 4 pages.
Lutz, "Nokia reveals new City Lens augmented reality app for Windows Phone 8 lineup," https://www.engadget.com/2012-09-11-nokia-reveals-new-city-lens-for-windows-phone-8.html, 3 pages.
Nayan, "Bytes: Livesight update integrates "City Lens" to Here Maps!! Nokia announces partnership with "Man of steel", releases promo," https://nokiapoweruser.com/bytes-livesight-update-integrates-city-lens-to-here-maps-nokia-announces-partnership-with-man-of-steel-release-promo-video/, 4 pages.
Webster, "Nokia's City Lens augmented reality app for Lumia Windows Phones comes out of beta," https://www.theverge.com/2012/9/2/3287420/nokias-city-lens-ar-app-launch, 2 pages.
"Nokia Image Space on video," https://blogs.windows.com/devices/2008/09/24/nokia-image-space-on-video/, 4 pages.
Montola et al., "Applying Game Achievement Systems to Enhance User Experience in a Photo Sharing Service," Proceedings of the 13th International MindTrek Conference: Everyday Life in the Ubiquitous Era, 2009, pp. 94-97.
Arghire, "Nokia Image Space Now Available for Download," https://news.softpedia.com/news/Nokia-Image-Space-Now-Available-for-Download-130523.shtml, 2 pages.
Then, "Nokia Image Space adds Augmented Reality for S60," https://www.slashgear.com/nokia-image-space-adds-augmented-reality-for-s60-3067185/, 6 pages.
Uusitalo et al., "A Solution for Navigating User-Generated Content," 2009 8th IEEE International Symposium on Mixed and Augmented Reality, 2009, pp. 219-220.
Bhushan, "Nokia Rolls out Livesight To Here Maps," https://www.digit.in/news/apps/nokia-rolls-out-livesight-to-here-maps-14740.html, 2 pages.
Blandford, "Here Maps adds LiveSight integration to let you "see" your destination," http://allaboutwindowsphone.com/news/item/17563_HERE_Maps_adds_LiveSight_integ.php, 16 pages.
Bonetti, "Here brings sight recognition to Maps," https://web.archive.org/web/20130608025413/http://conversations.nokia.com/2013/05/21/here-brings-sight-recognition-to-maps/, 5 pages.
Burns, "Nokia City Lens released from Beta for Lumia devices," https://www.slashgear.com/nokia-city-lens-released-from-beta-for-lumia-devices-1%20246841/, 9 pages.
Viswav, "Nokia Details The New LiveSight Experience On Here Maps," https://mspoweruser.com/nokia-details-the-new-livesight-experience-on-here-maps/, 19 pages.
Viswav, "Nokia Announces LiveSight, An Augmented Reality Technology," https://mspoweruser.com/nokia-announces-livesight-an-augmented-reality-technology/, 19 pages.
Varma, "Nokia Here Map gets integrated with LiveSight Augmented Reality feature," https://www.datareign.com/nokia-here-map-integrate-livesight-augmented-reality-feature/, 5 pages.
Bosma, "Nokia works on mobile Augmented Reality (AR)," https://www.extendlimits.nl/en/article/nokia-works-on-mobile-augmented-reality-ar, 6 pages.
Greene, "Hyperlinking Reality via Phones," https://www.technologyreview.com/2006/11/20/273250/hyperlinking-reality-via-phones/, 11 pages.
Knight, "Mapping the world on your phone," https://www.cnn.com/2007/TECH/science/05/23/Virtualmobile1/, 2 pages.
"MARA," https://web.archive.org/web/20100531083640/http://www.research.nokia.com:80/research/projects/mara, 3 pages.
Maubon, "A little bit of history from 2006: Nokia MARA project," https://www.augmented-reality.fr/2009/03/un-petit-peu-dhistoire-de-2006-projet-mara-de-nokia/, 7 pages.
"Nokia's MARA Connects The Physical World Via Mobile," https://theponderingprimate.blogspot.com/2006/11/nokias-mara-connects-physical-world.html, 14 pages.
Patro et al., "The anatomy of a large mobile massively multiplayer online game," Proceedings of the first ACM international workshop on Mobile gaming, 2012, 6 pages.
Schumann et al., "Mobile Gaming Communities: State of the Art Analysis and Business Implications," Central European Conference on Information and Intelligent Systems, 2011, 8 pages.
Organisciak, "Pico Safari: Active Gaming in Integrated Environments," https://organisciak.wordpress.com/2016/07/19/pico-safari-active-gaming-in-integrated-environments/, 21 pages.
"Plundr," https://web.archive.org/web/20110110032105/areacodeinc.com/projects/plundr/, 3 pages.
Caoili et al., "Plundr: Dangerous Shores' location-based gaming weighs anchor on the Nintendo DS," https://www.engadget.com/2007-06-03-plundr-dangerous-shores-location-based-gaming-weighs-anchor-on-the-nintendi-ds.html, 2 pages.
Miller, "Plundr, first location-based DS game, debuts at Where 2.0," https://www.engadget.com/2007-06-04-plundr-first-location-based-ds-game-debuts-at-where-2-0.html, 4 pages.
Blösch et al., "Vision Based MAV Navigation in Unknown and Unstructured Environments," 2010 IEEE International Conference on Robotics and Automation, 2010, 9 pages.
Castle et al., "Video-rate Localization in Multiple Maps for Wearable Augmented Reality," 2008 12th IEEE International Symposium on Wearable Computers, 2012, 8 pages.
Klein et al. "Parallel Tracking and Mapping for Small AR Workspaces," 2007 6th IEEE and ACM international symposium on mixed and augmented reality, 2007, 10 pages.
Klein et al. "Parallel tracking and mapping on a camera phone," 2009 8th IEEE International Symposium on Mixed and Augmented Reality, 2009, 4 pages.

(56) References Cited

OTHER PUBLICATIONS

Van Den Hengel et al., "In Situ Image-based Modeling," 2009 8th IEEE International Symposium on Mixed and Augmented Reality, 2009, 4 pages.
Hughes, "Taking social games to the next level," https://www.japantimes.co.jp/culture/2010/08/04/general/taking-social-games-to-the-next-level/, 1 page.
Kincaid, "TC50 Star Tonchidot Releases Its Augmented Reality Sekai Camera Worldwide," https://techcrunch.com/2009/12/21/sekai-camera/, 9 pages.
Martin, "Sekai Camera's new reality," https://www.japantimes.co.jp/life/2009/10/14/digital/sekai-cameras-new-reality/, 3 pages.
Nakamura et al., "Control of Augmented Reality Information Volume by Glabellar Fader," Proceedings of the 1st Augmented Human international Conference, 2010, 3 pages.
"Anime×Tsutaya×Sekai Camera," https://japanesevw.blogspot.com/2010/08/animetsutayasekai-camera.html#links, 4 pages.
"AR-RPG(ARPG) "Sekai Hero"," https://japanesevw.blogspot.com/2010/08/ar-rpgarpg-sekai-hero.html#links, 5 pages.
Toto, "Augmented Reality App Sekai Camera Goes Multi-Platform. Adds API And Social Gaming," https://techcrunch.com/2010/07/14/augmented-reality-app-sekai-camera-goes-multi-platform-adds-api-and-social-gaming/, 4 pages.
Hämäläinen, "[Job] Location Based MMORPG server engineers—Grey Area & Shadow Cities," https://erlang.org/pipermail/erlang-questions/2010-November/054788.html, 2 pages.
Jordan, "Grey Area CEO Ville Vesterinen on building out the success of location-based Finnish hit Shadow Cities," https://www.pocketgamer.com/grey-area-news/grey-area-ceo-ville-vesterinen-on-building-out-the-success-of-location-based-fin/, 4 pages.
"Shadow Cities," https://web.archive.org/web/20101114162700/http://www.shadowcities.com/, 7 pages.
Buchanan, "Star Wars: Falcon Gunner iPhone Review," https://www.ign.com/articles/2010/11/18/star-wars-falcon-gunner-iphone-review, 13 pages.
"THQ Wireless Launches Star Wars Arcade: Falcon Gunner," https://web.archive.org/web/20101129010405/http:/starwars.com/games/videogames/swarcade_falcongunner/index.html, 5 pages.
Firth, "Play Star Wars over the city: The incredible new game for iPhone that uses camera lens as backdrop for spaceship dogfights," https://www.dailymail.co.uk/sciencetech/article-1326564/Star-Wars-Arcade-Falcon-Gunner-iPhone-game-uses-camera-lens-backdrop.html, 24 pages.
Grundman, "Star Wars Arcade: Falcon Gunner Review," https://www.148apps.com/reviews/star-wars-arcade-falcon-gunner-review/, 11 pages.
"Star Wars Arcade: Falcon Gunner," https://www.macupdate.com/app/mac/35949/star-wars-arcade-falcon-gunner, downloaded on Feb. 9, 2021, 5 pages.
International Search Report and Written Opinion issued in International Application No. PCT/US2013/034164 dated Aug. 27, 2013, 11 pages.
Office Action issued in Japanese Application No. 2014-558993 dated Sep. 24, 2015, 7 pages.
Office Action issued in Japanese Application No. 2014-542591 dated Feb. 23, 2016, 8 pages.
Office Action issued in Japanese Application No. 2014-542591 dated Jul. 7, 2015, 6 pages.
Supplementary European Search Report issued in European Application No. 13854232.9 dated Jul. 24, 2015, 8 pages.
Supplementary European Search Report issued in European Application No. 12852089.7 dated Mar. 13, 2015, 8 pages.
Zhu et al., "Design of the Promo Pad: an Automated Augmented Reality Shopping Assistant," 12th Americas Conference on Information Systems, Aug. 4-6, 2006, 16 pages.
International Search Report and Written Opinion issued in International Application No. PCT/US2012/066300 dated Feb. 19, 2013, 9 pages.
International Preliminary Report on Patentability issued in International Application No. PCT/US2012/066300 dated Feb. 19, 2014, 12 pages.
Hardawar, "Naratte's Zoosh enables NFC with just a speaker and microphone," Venture Beat News, https://venturebeat.com/2011/06/19/narattes-zoosh-enables-nfc-with-just-a-speaker-and-microphone/, 24 pages.
Monahan, "Apple iPhone EasyPay Mobile Payment Rollout May Delay NFC," Javelin Strategy & Research Blog, Nov. 15, 2011, 3 pages.
"Augmented GeoTravel—Support," https://web.archive.org/web/20110118072624/http://www.augmentedworks.com/en/augmented-geotravel/augmented-geotravel-support, 2 pages.
"Augmented GeoTravel," https://web.archive.org/web/20200924232145/https://en.wikipedia.org/wiki/Augmented_GeoTravel, 2 pages.
"AugmentedWorks—iPhone Apps Travel Guide with AR: Augmented Geo Travel 3.0.0!," https://web.archive.org/web/20110128180606/http://www.augmentedworks.com/, 3 pages.
Rockwell et al., "Campus Mysteries: Serious Walking Around," Loading . . . The Journal of the Canadian Game Studies Association, 2013, vol. 7, No. 12, 18 pages.
"Louvre—DNP Museum Lab," https://www.museumlab.eu/exhibition/10/index.html, 5 pages.
Honkamaa et al., "A Lightweight Approach for Augmented Reality on Camera Phones using 2D Images to Simulate 3D," Proceedings of the 6th international conference on Mobile and ubiquitous multimedia, 2007, pp. 155-159.
Höllerer et al., "Mobile Augmented Reality," Telegeoinformatics: Location-based computing and services, vol. 21, 2004, 39 pages.
Raskar et al., "The Office of the Future: A Unified Approach to Image-Based Modeling and Spatially Immersive Displays," Proceedings of the 25th annual conference on Computer graphics and interactive techniques, 1998, 10 pages.
Loomis et al., "Personal Guidance System for the Visually Impaired using GPS, GIS, and VR Technologies," Proceedings of the first annual ACM conference on Assistive technologies, 1994, 5 pages.
Feiner et al., "A Touring Machine: Prototyping 3D Mobile Augmented Reality Systems for Exploring the Urban Environment," Personal Technologies, vol. 1, 1997, 8 pages.
Screen captures from YouTube video clip entitled "LiveSight for Here Maps—Demo on Nokia Lumia 928," 1 page, uploaded on May 21, 2013 by user "Mark Guim". Retrieved from Internet: <https://www.youtube.com/watch?v=Wf59vblvGmA>.
Screen captures from YouTube video clip entitled "Parallel Kingdom Cartography Sneak Peek," 1 page, uploaded on Oct. 29, 2010 by user "PerBlueInc". Retrieved from Internet: <https://www.youtube.com/watch?v=L0RdGh4aYis>.
Screen captures from YouTube video clip entitled "Parallel Kingdom—Video 4—Starting Your Territory.mp4," 1 page, uploaded on Aug. 24, 2010 by user "PerBlueInc". Retrieved from Internet: <https://www.youtube.com/watch?app=desktop&v=5zPXKo6yFzM>.
Screen captures from YouTube video clip entitled "Parallel Kingdom—Video 8—Basics of Trading.mp4," 1 page, uploaded on Aug. 24, 2010 by user "PerBlueInc". Retrieved from Internet: <https://www.youtube.com/watch?v=z6YCmMZvHbl>.
Screen captures from YouTube video clip entitled "Parallel Tracking and Mapping for Small AR Workspaces (PTAM)—extra," 1 page, uploaded on Nov. 28, 2007 by user "ActiveVision Oxford". Retrieved from Internet: <https://www.youtube.com/watch?v=Y9HMn6bd-v8>.
Screen captures from Vimeo video clip entitled "Tabletop Speed Trailer," 1 page, uploaded on Jun. 5, 2013 by user "Dekko". Retrieved from Internet: <https://vimeo.com/67737843>.
Screen captures from YouTube video clip entitled "Delorme PN-40: Viewing maps and Imagery," 1 page, uploaded on Jan. 21, 2011 by user "Take a Hike GPS". Retrieved from Internet: <https://www.youtube.com/watch?v=cMoKKfGDw4s>.
Screen captures from YouTube video clip entitled "Delorme Earthmate PN-40: Creating Waypoints," 1 page, uploaded on Nov. 22, 2010 by user "Take a Hike GPS". Retrieved from Internet: <https://www.youtube.com/watch?v=rGz-nFdAO9Y>.

(56) References Cited

OTHER PUBLICATIONS

Screen captures from YouTube video clip entitled "Google Maps Navigation (Beta)," 1 page, uploaded on Oct. 27, 2009 by user "Google". Retrieved from Internet: <https://www.youtube.com/watch?v=tGXK4jKN_jY>.
Screen captures from YouTube video clip entitled "Google Maps for mobile Layers," 1 page, uploaded on Oct. 5, 2009 by user "Google". Retrieved from Internet: <https://www.youtube.com/watch?v=1W90u0Y1HGI>.
Screen captures from YouTube video clip entitled "Introduction of Sekai Camera," 1 page, uploaded on Nov. 7, 2010 by user "tonchidot". Retrieved from Internet: <https://www.youtube.com/watch?v=oxnKOQkWwF8>.
Screen captures from YouTube video clip entitled "Sekai Camera for iPad," 1 page, uploaded on Aug. 17, 2010 by user "tonchidot". Retrieved from Internet: <https://www.youtube.com/watch?v=YGwyhEK8mV8>.
Screen captures from YouTube video clip entitled "TechCrunch 50 Presentation "SekaiCamera" by TonchiDot," 1 page, uploaded on Oct. 18, 2008 by user "tonchidot". Retrieved from Internet: <https://www.youtube.com/watch?v=FKgJTJojVEw>.
Screen captures from YouTube video clip entitled "Ville Vesterinen—Shadow Cities," 1 page, uploaded on Feb. 4, 2011 by user "momoams". Retrieved from Internet: <https://www.youtube.com/watch?v=QJ1BsgoKYew>.
Screen captures from YouTube video clip entitled ""Subway": Star Wars Arcade: Falcon Gunner Trailer #1," 1 page, uploaded on Nov. 3, 2010 by user "Im/nl Studios". Retrieved from Internet: <https://www.youtube.com/watch?v=CFSMXk8Dw10>.
Screen captures from YouTube video clip entitled "Star Wars Augmented Reality: TIE Fighters Attack NYC!," 1 page, uploaded on Nov. 3, 2010 by user "Im/nl Studios". Retrieved from Internet: <https://www.youtube.com/watch?v=LoodrUC05r0>.
Screen captures from YouTube video clip entitled "Streetmuseum," 1 page, uploaded on Dec. 1, 2010 by user "Jack Kerruish". Retrieved from Internet: <https://www.youtube.com/watch?v=qSfATEZiUYo>.
Screen captures from YouTube video clip entitled "UFO on Tape iPhone Gameplay Review—AppSpy.com," 1 page, uploaded on Oct. 5, 2010 by user "Pocket Gamer". Retrieved from Internet: <https://www.youtube.com/watch?v=Zv4J3ucwyJg>.
U.S. Appl. No. 18/378,977, filed on Oct. 11, 2023.
U.S. Appl. No. 18/385,889, filed on Oct. 31, 2023.
Macedonia et al., "A Taxonomy for Networked Virtual Environments," 1997, IEEE Muultimedia, 20 pages.
Macedonia, "A Network Software Architecture for Large Scale Virtual Environments," 1995, 31 pages.
Macedonia et al., "NPSNET: A Network Software Architecture for Large Scale Virtual Environments," 1994, Proceeding of the 19th Army Science Conference, 24 pages.
Macedonia et al., "NPSNET: A Multi-Player 3D Virtual Environment Over the Internet," 1995, ACM, 3 pages.
Macedonia et al., "Exploiting Reality with Multicast Groups: A Network Architecture for Large-scale Virtual Environments," Proceedings of the 1995 IEEE Virtual Reality Annual Symposium, 14 pages.
Paterson et al., "Design, Implementation and Evaluation of Audio for a Location Aware Augmented Reality Game," 2010, ACM, 9 pages.
Organisciak et al., "Pico Safari: Active Gaming in Integrated Environments," Jul. 19, 2016, 22 pages.
Raskar et al., "Spatially Augmented Reality," 1998, 8 pages.
Raskar et al., "The Office of the Future: A Unified Approach to Image-Based Modeling and Spatially Immersive Displays," 1998, Computer Graphics Proceedings, Annual Conference Series, 10 pages.
Grasset et al., "MARE: Multiuser Augmented Reality Environment on table setup," 2002, 2 pages.
Behringer et al., "A Wearable Augmented Reality Testbed for Navigation and Control, Built Solely with Commercial-Off-The-Shelf (COTS) Hardware," International Symposium in Augmented Reality (ISAR 2000) in München (Munich), Oct. 5-6, 2000, 9 pages.
Behringer et al., "Two Wearable Testbeds for Augmented Reality: itWARNS and WIMMIS," International Symposium on Wearable Computing (ISWC 2000), Atlanta, Oct. 16-17, 2000, 3 pages.
Hartley et al., "Multiple View Geometry in Computer Vision, Second Edition," Cambridge University Press, 673 pages.
Wetzel et al., "Guidelines for Designing Augmented Reality Games," 2008, ACM, 9 pages.
Kasahara et al., "Second Surface: Multi-user Spatial Collaboration System based on Augmented Reality," 2012, Research Gate, 5 pages.
Diverdi et al., "Envisor: Online Environment Map Construction for Mixed Reality," 8 pages.
Benford et al., "Understanding and Constructing Shared Spaces with Mixed-Reality Boundaries," 1998, ACM Transactions on Computer-Human Interaction, vol. 5, No. 3, 40 pages.
Mann, "Humanistic Computing: "WearComp" as a New Framework and Application for Intelligent Signal Processing," 1998, IEEE, 29 pages.
Feiner et al., "Knowledge-Based Augmented Reality," 1993, Communications of the ACM, 68 pages.
Bible et al., "Using Spread-Spectrum Ranging Techniques for Position Tracking in a Virtual Environment," 1995, Proceedings of Network Realities, 16 pages.
Starner et al., "Mind-Warping: Towards Creating a Compelling Collaborative Augmented Reality Game," 2000, ACM, 4 pages.
Hollerer et al., "Chapter Nine—Mobile Augmented Reality," 2004, Taylor & Francis Books Ltd., 39 pages.
Langlotz et al., "Online Creation of Panoramic Augmented-Reality Annotations on Mobile Phones," 2012, IEEE, 9 pages.
Kuroda et al., "Shared Augmented Reality for Remote Work Support," 2000, IFAC Manufacturing, 5 pages.
Ramirez et al., "Chapter 5—Soft Computing Applications in Robotic Vision Systems," 2007, I-Tech Education and Publishing, 27 pages.
Lepetit et al., "Handling Occlusion in Augmented Reality Systems: A Semi-Automatic Method," 2000, IEEE, 11 pages.
Zhu et al., "Personalized In-store E-Commerce with the PromoPad: an Augmented Reality Shopping Assistant," 2004, Electronic Journal for E-commerce Tools, 20 pages.
Broll et al., "Toward Next-Gen Mobile AR Games," 2008, IEEE, 10 pages.
Lee et al., "Exploiting Context-awareness in Augmented Reality Applications," International Symposium on Ubiquitous Virtual Reality, 4 pages.
Tian et al., "Real-Time Occlusion Handling in Augmented Reality Based on an Object Tracking Approach," www.mdpi.com/journal/sensors, 16 pages.
Szalavári et al., "Collaborative Gaming in Augmented Reality," 1998, ACM, 20 pages.
Sheng et al., "A Spatially Augmented Reality Sketching Interface for Architectural Daylighting Design," 2011, IEEE, 13 pages.
Szeliski et al., "Computer Vision: Algorithms and Applications," 2010, Springer, 874 pages.
Avery et al., "Improving Spatial Perception for Augmented Reality X-Ray Vision," 2009, IEEE, 4 pages.
Brutzman et al., "Internetwork Infrastructure Requirements for Virtual Environments," 1995, Proceedings of the Virtual Reality Modeling Language (VRML) Symposium, 11 pages.
Selman, "Java 3D Programming," 2002, Manning Publications, 352 pages.
Bradski et al., "Learning OpenCV," 2008, O'Reilly Media, 572 pages.
Schmeil et al., "MARA—Mobile Augmented Reality-Based Virtual Assistant," 2007, IEEE Virtual Reality Conference 2007, 5 pages.
Macedonia et al., "NPSNET: A Network Software Architecture for Large Scale Virtual Environments," 1994, Presence, Massachusetts Institute of Technology, 30 pages.
Guan et al., "Spherical Image Processing for Immersive Visualisation and View Generation," 2011, Thesis submitted to the University of Lancashire, 133 pages.
Sowizral et al., "The Java 3D API Specification—Second Edition," 2000, Sun Microsystems, Inc., 664 pages.

(56) References Cited

OTHER PUBLICATIONS

Moore, "A Tangible Augmented Reality Interface to Tiled Street Maps and its Usability Testing," 2006, Springer-Verlag, 18 pages.
Ismail et al., "Multi-user Interaction in Collaborative Augmented Reality for Urban Simulation," 2009, IEEE Computer Society, 10 pages.
Organisciak et al., "Pico Safari—Active Gaming in Integrated Environments," 2011, SDH-SEMI (available at https://www.slideshare .net/PeterOrganisciak/pico-safari-sdsemi-2011).
Davison, "Chapter 7 Walking Around the Models," Pro Java™ 6 3D Game Development Java 3D, 23 pages.
"Archive for the 'Layers' Category," May 29, 2019, Layar.
Neider et al., "OpenGL programming guide," 1993, vol. 478, 438 pages.
Singhal et al., "Netwoked Virtual Environments—Design and Implementation", ACM Press, Addison Wesley, 1999, 368 pages.
Vince, "Introduction to Virtual Reality," 2004, Springer-Verlag, 97 pages.
Fuchs et al., "Virtual Reality: Concepts and Technologies," 2006, CRC Press, 56 pages.
Arieda, "A Virtual / Augmented Reality System with Kinaesthetic Feedback—Virtual Environment with Force Feedback System," 2012, LAP Lambert Academic Publishing, 31 pages.
Sperber et al., "Web-based mobile Augmented Reality: Developing with Layar (3D)," 2010, 7 pages.
"WXHMD—A Wireless Head-Mounted Display with embedded Linux," 2009, Pabr.org, 8 pages.
"XMP Adding Intelligence to Media—XMP Specification Part 3—Storage in Files," 2014, Adobe Systems Inc., 78 pages.
Zhao, "A survey on virtual reality," 2009, Springer, 54 pages.
Zipf et al., "Using Focus Maps to Ease Map Reading—Developing Smart Applications for Mobile Devices," 3 pages.
Gammeter et al., "Server-side object recognition and client-side object tracking for mobile augmented reality," 2010, IEEE, 8 pages.
Martedi et al., "Foldable Augmented Maps," 2012, IEEE, 11 pages.
Martedi et al., "Foldable Augmented Maps," 2010, IEEE, 8 pages.
Morrison et al., "Like Bees Around the Hive: A Comparative Study of a Mobile Augmented Reality Map," 2009, 10 pages.
Takacs et al., "Outdoors Augmented Reality on Mobile Phone using Loxel-Based Visual Feature Organization," 2008, ACM, 8 pages.
Livingston et al., "An Augmented Reality System for Military Operations in Urban Terrain," 2002, Proceedings of the Interservice/Industry Training, Simulation, & Education Conference , 8 pages.
Sappa et al., "Chapter 3—Stereo Vision Camera Pose Estimation for On-Board Applications," 2007, I-Tech Education and Publishing, 12 pages.
Light et al., "Chutney and Relish: Designing to Augment the Experience of Shopping at a Farmers' Market," 2010, ACM, 9 pages.
Bell et al., "View Management for Virtual and Augmented Reality," 2001, ACM, 11 pages.
Cyganek et al., "An Introduction to 3D Computer Vision Techniques and Algorithms," 2009, John Wiley & Sons, Ltd, 502 pages.
Lu et al., "Foreground and Shadow Occlusion Handling for Outdoor Augmented Reality," 2010, IEEE, 10 pages.
Lecocq-Botte et al., "Chapter 25—Image Processing Techniques for Unsupervised Pattern Classification," 2007, pp. 467-488.
Lombardo, "Hyper-NPSNET: embedded multimedia in a 3D virtual world," 1993, 83 pages.
Doignon, "Chapter 20—An Introduction to Model-Based Pose Estimation and 3-D Tracking Techniques," 2007, IEEE, I-Tech Education and Publishing, 26 pages.
Forsyth et al., "Computer Vision A Modern Approach, Second Edition," 2012, Pearson Education, Inc., Prentice Hall, 793 pages.
Breen et al., "Interactive Occlusion and Collision of Real and Virtual Objects in Augmented Reality," 1995, ECRC, 22 pages.
Breen et al., "Interactive Occlusion and Automatic Object Placement for Augmented Reality," 1996, Eurographics (vol. 15, No. 3), 12 pages.

Pratt et al., "Insertion of an Articulated Human into a Networked Virtual Environment," 1994, Proceedings of the 1994 AI, Simulation and Planning in High Autonomy Systems Conference, 12 pages.
Schmalstieg et al., "Bridging Multiple User Interface Dimensions with Augmented Reality," 2000, IEEE, 10 pages.
Brutzman et al., "Virtual Reality Transfer Protocol (VRTP) Design Rationale," 1997, Proceedings of the IEEE Sixth International Workshop on Enabling Technologies, 10 pages.
Brutzman et al., "Internetwork Infrastructure Requirements for Virtual Environments," 1997, National Academy Press, 12 pages.
Han, "Chapter 1—Real-Time Object Segmentation of the Disparity Map Using Projection-Based Region Merging," 2007, I-Tech Education and Publishing, 20 pages.
George et al., "A Computer-Driven Astronomical Telescope Guidance and Control System with Superimposed Star Field and Celestial Coordinate Graphics Display," 1989, J. Roy. Astron. Soc. Can., The Royal Astronomical Society of Canada, 10 pages.
Marder-Eppstein et al., "The Office Marathon: Robust Navigation in an Indoor Office Environment," 2010, IEEE International Conference on Robotics and Automation, 8 pages.
Barba et al., "Lessons from a Class on Handheld Augmented Reality Game Design," 2009, ACM, 9 pages.
Reitmayr et al., "Collaborative Augmented Reality for Outdoor Navigation and Information Browsing," 2004, 12 pages.
Reitmayr et al., "Going out: Robust Model-based Tracking for Outdoor Augmented Reality," 2006, IEEE, 11 pages.
Regenbrecht et al., "Interaction in a Collaborative Augmented Reality Environment," 2002, CHI, 2 pages.
Herbst et al., "TimeWarp: Interactive Time Travel with a Mobile Mixed Reality Game," 2008, ACM, 11 pages.
Loomis et al., "Personal Guidance System for the Visually Impaired using GPS, GIS, and VR Technologies," 1993, VR Conference Proceedings , 8 pages.
Rekimoto, "Transvision: A hand-held augmented reality system for collaborative design, "1996, Research Gate, 7 pages.
Morse et al., "Multicast Grouping for Data Distribution Management," 2000, Proceedings of the Computer Simulation Methods and Applications Conference, 7 pages.
Morse et al., "Online Multicast Grouping for Dynamic Data Distribution Management," 2000, Proceedings of the Fall 2000 Simulation Interoperability Workshop, 11 pages.
Cheverst et al., "Developing a Context-aware Electronic Tourist Guide: Some Issues and Experiences," 2000, Proceedings of the Fall 2000 Simulation Interoperability Workshop, 9 pages.
Squire et al., "Mad City Mystery: Developing Scientific Argumentation Skills with a Place-based Augmented Reality Game on Handheld Computers," 2007, Springer, 25 pages.
Romero et al., "Chapter 10—A Tutorial on Parametric Image Registration," 2007, I-Tech Education and Publishing, 18 pages.
Rosenberg, "The Use of Virtual Fixtures as Perceptual Overlays to Enhance Operator Performance in Remote Environments," 1992, Air Force Material Command, 53 pages.
Livingston et al., "Mobile Augmented Reality: Applications and Human Factors Evaluations," 2006, Naval Research Laboratory, 32 pages.
Gabbard et al., "Resolving Multiple Occluded Layers in Augmented Reality," 2003, IEEE, 11 pages.
Wloka et al., "Resolving Occlusion in Augmented Reality," 1995, ACM, 7 pages.
Zyda, "VRAIS Panel on Networked Virtual Environments," Proceedings of the 1995 IEEE Virtual Reality Annual Symposium, 2 pages.
Zyda et al., "NPSNET-Human: Inserting the Human into the Networked Synthetic Environment," 1995, Proceedings of the 13th DIS Workshop, 5 pages.
International Search Report and Written Opinion issued in International Application No. PCT/US2012/032204 dated Oct. 29, 2012.
Wauters, "Stanford Graduates Release Pulse, A Must-Have News App For The iPad," Techcrunch.com, techcrunch.com/2010/05/31/pulse-ipad/.
Hickins, "A License to Pry," The Wall Street Journal, http://blogs.wsj.com/digits/2011/03/10/a-license-to-pry/tab/print/.

(56) References Cited

OTHER PUBLICATIONS

Notice of Reasons for Rejection issued in Japanese Patent Application No. 2014-503962 dated Sep. 22, 2014.
Notice of Reasons for Rejection issued in Japanese Patent Application No. 2014-503962 dated Jun. 30, 2015.
European Search Report issued in European Patent Application No. 12767566.8 dated Mar. 20, 2015.
"3D Laser Mapping Launches Mobile Indoor Mapping System," 3D Laser Mapping, Dec. 3, 2012, 1 page.
Banwell et al., "Combining Absolute Positioning and Vision for Wide Area Augmented Reality," Proceedings of the International Conference on Computer Graphics Theory and Applications, 2010, 4 pages.
Li et al., "3-D Motion Estimation and Online Temporal Calibration for Camera-IMU Systems," Proceedings of the IEEE International Conference on Robotics and Automation (ICRA), 2013, 8 pages.
Li et al., "High-fidelity Sensor Modeling and Self-Calibration in Vision-aided Inertial Navigation," Proceedings of the IEEE International Conference on Robotics and Automation (ICRA), 2014, 8 pages.
Li et al., "Online Temporal Calibration for Camera-IMU Systems: Theory and Algorithms," International Journal of Robotics Research, vol. 33, Issue 7, 2014, 16 pages.
Li et al., "Real-time Motion Tracking on a Cellphone using Inertial Sensing and a Rolling-Shutter Camera," Proceedings of the IEEE International Conference on Robotics and Automation (ICRA), 2013, 8 pages.
Mourikis, "Method for Processing Feature Measurements in Vision-Aided Inertial Navigation," 3 pages.
Mourikis et al., "Methods for Motion Estimation With a Rolling-Shutter Camera," Proceedings of the IEEE International Conference on Robotics and Automation (ICRA), Karlsruhe, Germany May 6-10, 2013, 9 pages.
Panzarino, "What Exactly WiFiSlam Is, And Why Apple Acquired It," http://thenextweb.com/apple/2013/03/26/what-exactly-wifislam-is-and-why-apple-acquired-it, Mar. 26, 2013, 10 pages.
Vondrick et al., "HOGgles: Visualizing Object Detection Features," IEEE International Conference on Computer Vision (ICCV), 2013, 9 pages.
Vu et al., "High Accuracy and Visibility-Consistent Dense Multiview Stereo," IEEE Transactions on Pattern Analysis and Machine Intelligence, 2012, vol. 34, No. 5, 13 pages.
International Search Report and Written Opinion issued in International Application No. PCT/US2014/061283 dated Aug. 5, 2015, 11 pages.
Pang et al., "Development of a Process-Based Model for Dynamic Interaction in Spatio-Temporal GIS", GeoInformatica, 2002, vol. 6, No. 4, pp. 323-344.
Zhu et al., "The Geometrical Properties of Irregular 2D Voronoi Tessellations," Philosophical Magazine A, 2001, vol. 81, No. 12, pp. 2765-2783.
"S2 Cells," S2Geometry, https://s2geometry.io/devguide/s2cell_hierarchy, 27 pages.
Bimber et al., "A Brief Introduction to Augmented Reality, in Spatial Augmented Reality," 2005, CRC Press, 23 pages.
Milgram et al., "A Taxonomy of Mixed Reality Visual Displays," IEICE Transactions on Information and Systems, 1994, vol. 77, No. 12, pp. 1321-1329.
Normand et al., "A new typology of augmented reality applications," Proceedings of the 3rd augmented human international conference, 2012, 9 pages.
Sutherland, "A head-mounted three dimensional display," Proceedings of the Dec. 9-11, 1968, Fall Joint Computer Conference, part I, 1968, pp. 757-764.
Maubon, "A little bit of history from 2006: Nokia's MARA project," https://www.augmented-reality.fr/2009/03/un-petit-peu-dhistoire-de-2006-projet-mara-de-nokia/, 7 pages.
Madden, "Professional Augmented Reality Browsers for Smartphones," 2011, John Wiley & Sons, 44 pages.

Raper et al., "Applications of location-based services: a selected review," Journal of Location Based Services, 2007, vol. 1, No. 2, pp. 89-111.
Savage, "Blazing gyros: The evolution of strapdown inertial navigation technology for aircraft," Journal of Guidance, Control, and Dynamics, 2013, vol. 36, No. 3, pp. 637-655.
Kim et al., "A Step, Stride and Heading Determination for the Pedestrian Navigation System," Journal of Global Positioning Systems, 2004, vol. 3, No. 1-2, pp. 273-279.
"Apple Reinvents the Phone with iPhone," Apple, dated Jan. 9, 2007, https://www.apple.com/newsroom/2007/01/09Apple-Reinvents-the-Phone-with-iPhone/, 5 pages.
Macedonia et al., "Exploiting reality with multicast groups: a network architecture for large-scale virtual environments," Proceedings Virtual Reality Annual International Symposium'95, 1995, pp. 2-10.
Magerkurth et al., "Pervasive Games: Bringing Computer Entertainment Back to the Real World," Computers in Entertainment (CIE), 2005, vol. 3, No. 3, 19 pages.
Thomas et al., "ARQuake: An Outdoor/Indoor Augmented Reality First Person Application," Digest of Papers. Fourth International Symposium on Wearable Computers, 2000, pp. 139-146.
Thomas et al., "First Person Indoor/Outdoor Augmented Reality Application: ARQuake," Personal and Ubiquitous Computing, 2002, vol. 6, No. 1, pp. 75-86.
Zyda, "From Visual Simulation to Virtual Reality to Games," IEEE Computer Society, 2005, vol. 38, No. 9, pp. 25-32.
Zyda, "Creating a Science of Games," Communications-ACM, 2007, vol. 50, No. 7, pp. 26-29.
"Microsoft Computer Dictionary," Microsoft, 2002, 10 pages.
"San Francisco street map," David Rumsey Historical Map Collection, 1953, https://www.davidrumsey.com/luna/servlet/s/or3ezx, 2 pages.
"Official Transportation Map (2010)," Florida Department of Transportation, https://www.fdot.gov/docs/default-source/geospatial/past_statemap/maps/FLStatemap2010.pdf, 2010, 2 pages.
Krogh, "GPS," American Society of Media Photographers, dated Mar. 22, 2010, 10 pages.
"Tigo: Smartphone, 2," Ads of the World, https://www.adsoftheworld.com/media/print/tigo_smartphone_2, 6 pages.
Ta et al., "SURFTrac: Efficient Tracking and Continuous Object Recognition using Local Feature Descriptors," 2009 IEEE Conference on Computer Vision and Pattern Recognition, 2009, pp. 2937-2944.
Office Action issued in Chinese Application No. 201710063195.8 dated Mar. 24, 2021, 9 pages.
U.S. Appl. No. 10/438,172 filed on May 13, 2003.
U.S. Appl. No. 60/496,752, filed on Aug. 21, 2003.
U.S. Appl. No. 60/499,810, filed on Sep. 2, 2003.
U.S. Appl. No. 60/502,939, filed on Sep. 16, 2003.
U.S. Appl. No. 60/628,475, filed on Nov. 16, 2004.
U.S. Appl. No. 61/411,591, filed on Nov. 9, 2010.
Vallino, "Interactive Augmented Reality," 1998, University of Rochester, 109 pages.
Jay et al., "Amplifying Head Movements with Head-Mounted Displays," 2003, Presence, Massachusetts Institute of Technology, 10 pages.
Julier et al., "Information Filtering for Mobile Augmented Reality," 2000, IEEE and ACM International Symposium on Augmented Reality , 10 pages.
Julier et al., "Information Filtering for Mobile Augmented Reality," Jul. 2, 2002, IEEE, 6 pages.
Kalwasky, "The Science of Virtual Reality and Virtual Environments," 1993, Addison-Wesley, 215 pages.
Kerr et al., "Wearable Mobile Augmented Reality: Evaluating Outdoor User Experience," 2011, ACM, 8 pages.
Kopper et al., "Towards an Understanding of the Effects of Amplified Head Rotations," 2011, IEEE, 6 pages.
MacIntyre et al., "Estimating and Adapting to Registration Errors in Augmented Reality Systems," 2002, Proceedings IEEE Virtual Reality 2002, 9 pages.
Feißt, "3D Virtual Reality on mobile devices," 2009, VDM Verlag Dr. Muller Aktiengesellschaft & Co. KG, 53 pages.

(56) References Cited

OTHER PUBLICATIONS

Chua et al., "MasterMotion: Full Body Wireless Virtual Reality for Tai Chi," Jul. 2002, ACM SIGGRAPH 2002 conference abstracts and applications, 1 page.
Melzer et al., "Head-Mounted Displays: Designing for the User," 2011, 85 pages.
Vorländer, "Auralization—Fundamentals of Acoustics, Modelling, Simulation, Algorithms and Acoustic Virtual Reality," 2008, Springer, 34 pages.
Miller et al., "The Virtual Museum: Interactive 3D Navigation of a Multimedia Database," Jul./Sep. 1992, John Wiley & Sons, Ltd., 3 pages.
Koenen, "MPEG-4 Multimedia for our time," 1999, IEEE Spectrum, 8 pages.
Navab et al., "Laparoscopic Virtual Mirror," 2007, IEEE Virtual Reality Conference, 8 pages.
Ochi et al., "HMD Viewing Spherical Video Streaming System," 2014, ACM, 2 pages.
Olson et al., "A Design for a Smartphone—Based Head Mounted Display," 2011, 2 pages.
Pagarkar et al., "MPEG-4 Tech Paper," 24 pages.
Pausch, "Virtual Reality on Five Dollars a Day," 1991, ACM, 6 pages.
Peternier et al., "Wearable Mixed Reality System In Less Than 1 Pound," 2006, The Eurographics Assoc., 10 pages.
Piekarski et al., "ARQuake—Modifications and Hardware for Outdoor Augmented Reality Gaming," 9 pages.
Piekarski, "Interactive 3d modelling in outdoor augmented reality worlds," 2004, The University of South Australia, 264 pages.
Piekarski et al., "Tinmith-Metro: New Outdoor Techniques for Creating City Models with an Augmented Reality Wearable Computer," 2001, IEEE, 8 pages.
Piekarski et al., "The Tinmith System—Demonstrating New Techniques for Mobile Augmented Reality Modelling," 2002, 10 pages.
Piekarski et al., "ARQuake: The Outdoor Augmented Reality Gaming System," 2002, Communications of the ACM, 3 pages.
Piekarski et al., "Integrating Virtual and Augmented Realities in an Outdoor Application," 1999, 10 pages.
Pimentel et al., "Virtual Reality—Through the new looking glass," 1993, Windcrest McGraw-Hill, 45 pages.
Basu et al., "Poster: Evolution and Usability of Ubiquitous Immersive 3D Interfaces," 2013, IEEE, 2 pages.
Pouwelse et al., "A Feasible Low-Power Augmented—Reality Terminal," 1999, 10 pages.
Madden, "Professional Augmented Reality Browsers for Smartphones," 2011, John Wiley & Sons, 345 pages.
"Protecting Mobile Privacy: Your Smartphones, Tablets, Cell Phones and Your Privacy—Hearing," May 10, 2011, U.S. Government Printing Office, 508 pages.
Rashid et al., "Extending Cyberspace: Location Based Games Using Cellular Phones," 2006, ACM, 18 pages.
Reid et al., "Design for coincidence: Incorporating real world artifacts in location based games," 2008, ACM, 8 pages.
Rockwell et al., "Campus Mysteries: Serious Walking Around," 2013, Journal of the Canadian Studies Association, vol. 7(12): 1-18, 18 pages.
Shapiro, "Comparing User Experience in a Panoramic HMD vs. Projection Wall Virtual Reality System," 2006, Sensics, 12 pages.
Sestito et al., "Intelligent Filtering for Augmented Reality," 2000, 8 pages.
Sherman et al., "Understanding Virtual Reality," 2003, Elsevier, 89 pages.
Simcock et al., "Developing a Location Based Tourist Guide Application," 2003, Australian Computer Society, Inc., 7 pages.
"Sony—Head Mounted Display Reference Guide," 2011, Sony Corporation, 32 pages.
Hollister, "Sony HMZ-T1 Personal 3D Viewer Review—The Verge," Nov. 10, 2011, The Verge, 25 pages.
Gutiérrez et al., "Stepping into Virtual Reality," 2008, Springer-Verlag, 33 pages.
"Summary of QuickTime for Java," 90 pages.
Sutherland, "A head-mounted three dimensional display," 1968, Fall Joint Computer Conference, 8 pages.
Sutherland, "The Ultimate Display," 1965, Proceedings of IFIP Congress, 2 pages.
Thomas et al., "ARQuake: An Outdoor/Indoor Augmented Reality First Person Application, "2000, IEEE, 8 pages.
Thomas et al., "First Person Indoor/Outdoor Augmented Reality Application: ARQuake," 2002, Springer-Verlag, 12 pages.
Wagner et al., "Towards Massively Multi-user Augmented Reality on Handheld Devices," May 2005, Lecture Notes in Computer Science, 13 pages.
Shin et al., "Unified Context-aware Augmented Reality Application Framework for User-Driven Tour Guides," 2010, IEEE, 5 pages.
Julier et al., "Chapter 6—Urban Terrain Modeling For Augmented Reality Applications," 2001, Springer, 20 pages.
"Adobe Flash Video File Format Specification Version 10.1," 2010, Adobe Systems Inc., 89 pages.
Arghire, "Glu Mobile's 1000: Find 'Em All! Game Available in the App Store," https://news.softpedia.com/news/Glu-Mobile-s-1000-Find-Em-All-Game-Available-in-the-App-Store-134126.shtml, 2 pages.
Buchanan, "1,000: Find 'Em All Preview," https://www.ign.com/articles/2009/10/16/1000-find-em-all-preview, 8 pages.
Hirst, "Glu Mobile Announces '1000 Find Em All'. Real World GPS-Based Adventure for iPhone," https://www.148apps.com/news/glu-mobile-announces-1000-find-em-all-real-world-gpsbased-adventure-iphone/, 8 pages.
Tschida, "You Can Now Find 1000: Find Em All! In The App Store," https://appadvice.com/appnn/2010/02/you-can-now-find-1000-find-em-all-in-the-app-store, 3 pages.
Piekarski et al., "ARQuake: the outdoor augmented reality gaming system," Communications of the ACM, 2002, vol. 45, No. 1, pp. 36-38.
Piekarski et al., "ARQuake—Modifications and Hardware for Outdoor Augmented Reality Gaming," Linux Australia, 2003, 9 pages.
Randell, "Wearable Computing: A Review," 16 pages.
Thomas et al., "ARQuake: An Outdoor/Indoor Augmented Reality First Person Application," University of South Australia, 2000, 8 pages.
Thomas et al., "First Person Indoor/Outdoor Augmented Reality Application: ARQuake," Personal and Ubiquitous Computing, 2002, vol. 6, pp. 75-86.
Thomas et al., "Usability and Playability Issues for ARQuake," 2003, 8 pages.
Livingston et al., "An augmented reality system for military operations in urban terrain," Interservice/Industry Training, Simulation, and Education Conference, 2002, vol. 89, 9 pages.
Livingston et al., "Mobile Augmented Reality: Applications and Human Factors Evaluations," 2006, 16 pages.
Cutler, "Dekko Debuts An Augmented Reality Racing Game Playable From The iPad," Techcrunch, https://techcrunch.com/2013/06/09/dekko-2/, 8 pages.
"Dekko's TableTop Speed AR Proof of Concept," www.gametrender.net/2013/06/dekkos-tabletop-speed-ar-proof-of.html, 2 pages.
"Racing AR Together," https://augmented.org/2013/06/racing-ar-together/, 3 pages.
"DeLorme PN-40," www.gpsreview.net/delorme-pn-40/, downloaded on Mar. 8, 2021, 37 pages.
Owings, "Delorme Earthmate PN-40 review," https://gpstracklog.com/2009/02/delorme-earthmate-pn-40-review.html, 17 pages.
"Astro owner's manual," https://static.garmin.com/pumac//Astro_OwnersManual.pdf, 76 pages.
"Geko 201 Personal Navigator," https://static.garmin.com/pumac/Geko201_OwnersManual.pdf, 52 pages.
"Geko 301," https://www.garmin.com/en-US/p/221, 3 pages.
"GPS 60," https://static.garmincdn.com/pumac/GPS60_OwnersManual.pdf, 90 pages.
Butler, "How does Google Earth work?," https://www.nature.com/news/2006/060213/full/060213-7.html, 2 pages.
Castello, "How's the weather?," https://maps.googleblog.com/2007/11/hows-weather.html, 3 pages.

(56) References Cited

OTHER PUBLICATIONS

Friedman, "Google Earth for iPhone and iPad," https://www.macworld.com/article/1137794/googleearth_iphone.html, downloaded on Sep. 7, 2010, 3 pages.
"Google Earth," http://web.archive.org/web/20091213164811/http://earth.google.com/, 1 page.
Mellen, "Google Earth 2.0 for iPhone released," https://www.gearthblog.com/blog/archives/2009/11/google_earth_20_for_iphone_released.html, downloaded on Mar. 5, 2021, 5 pages.
"Google Earth iPhone," http:/web.archive.org/web/20091025070614/http://www.google.com/mobile/products/earth.html, 1 page.
Schwartz, "Send In The Clouds: Google Earth Adds Weather Layer," https://searchengineland.com/send-in-the-clouds-google-earth-adds-weather-layer-12651, 5 pages.
Senoner, "Google Earth and Microsoft Virtual Earth two Geographic Information Systems," 2007, 44 pages.
Barth, "Official Google Blog: The bright side of sitting in traffic: Crowdsourcing road congestion data," https://googleblog.blogspot.com/2009/08/bright-side-of-sitting-in-traffic.html, 4 pages.
Soni, "Introducing Google Buzz for mobile: See buzz around you and tag posts with your location.," googlemobile.blogspot.com/2010/02/introducing-google-buzz-for-mobile-see.html, 15 pages.
Chu, "New magical blue circle on your map," https://googlemobile.blogspot.com/2007/11/new-magical-blue-circle-on-your-map.html, 20 pages.
Google Maps for your phone, https://web.archive.org/web/20090315195718/http://www.google.com/mobile/default/maps.html, 2 pages.
Get Google on your phone, http://web.archive.org/web/20091109190817/http://google.com/mobile/#p=default, 1 page.
Gundotra, "To 100 million and beyond with Google Maps for mobile," https://maps.googleblog.com/2010/08/to-100-million-and-beyond-with-google.html, 6 pages.
Introducing Google Buzz for mobile: See buzz around you and tag posts with your location, https://maps.googleblog.com/2010/02/introducing-google-buzz-for-mobile-see.html, 16 pages.
"Google Maps Navigation (Beta)," http://web.archive.org/web/20091101030954/http://www.google.com:80/mobile/navigation/index.html#p=default, 3 pages.
Miller, "Googlepedia: the ultimate Google resource," 2008, Third Edition, 120 pages.
"Upgrade your phone with free Google products," http://web.archive.org/web/20090315205659/http://www.google.com/mobile/, 1 page.
"Google blogging in 2010," https://googleblog.blogspot.com/2010/, 50 pages.
Cheok et al., "Human Pacman: A Mobile Entertainment System with Ubiquitous Computing and Tangible Interaction over a Wide Outdoor Area," 2003, Human-Computer Interaction with Mobile Devices and Services: 5th International Symposium, Mobile HCI 2003, Udine, Italy, Sep. 2003. Proceedings 5, 17 pages.
Knight, "Human PacMan hits real city streets," https://www.newscientist.com/article/dn6689-human-pacman-hits-real-city-streets/, 5 pages.
Sandhana, "Pacman comes to life virtually," http://news.bbc.co.uk/2/hi/technology/4607449.stm, 3 pages.
"Introducing myNav: Peter Cooper Village/Stuyvesant Town," https://appadvice.com/app/mynav-peter-cooper-village/383793988, 3 pages.
"MyNav: Peter Cooper Village/Stuyvesant Town," mynav-peter-cooper-villagestuyvesant-town.appstor.io/zh, 2 pages.
Wolke, "Digital Wayfinding Apps," https://web.archive.org/web/20200927073039/https://segd.org/digital-wayfinding-apps, 5 pages.
"Nike+ GPS: There's an App for That," https://www.runnersworld.com/races-places/a20818818/nike-gps-theres-an-app-for-that/, 3 pages.
Biggs, "Going The Distance: Nike+ GPS Vs. RunKeeper," https://techcrunch.com/2010/10/09/going-the-distance-nike-gps-vs-runkeeper/, 4 pages.
Harris, "How Does the Nike Plus Work?," https://www.livestrong.com/article/533191-how-does-the-nike-plus-work/, 3 pages.

Rainmaker, "Nike+ Sportwatch GPS In Depth Review," https://www.dcrainmaker.com/2011/04/nike-sportwatch-gps-in-depth-review.html, 118 pages.
Nelson, "THQ Announces 'Star Wars: Falcon Gunner' Augmented Reality Shooter," https://toucharcade.com/2010/11/04/thq-announces-star-wars-falcon-gunner-augmented-reality-shooter/, 6 pages.
Rogers, "Review: Star Wars Arcade: Falcon Gunner," isource.com/2010/12/04/review-star-wars-arcade-falcon-gunner/, downloaded on Feb. 9, 2021, 14 pages.
Schonfeld, "The First Augmented Reality Star Wars Game, Falcon Gunner, Hits The App Store," https://techcrunch.com/2010/11/17/star-wars-iphone-falcon-gunner/, 15 pages.
"How It Works," https://web.archive.org/web/20130922212452/http://www.strava.com/how-it-works, 4 pages.
"Tour," https://web.archive.org/web/20110317045223/http://www.strava.com/tour, 9 pages.
Eccleston-Brown, "Old London seen with new eyes thanks to mobile apps," http://news.bbc.co.uk/local/london/hi/things_to_do/newsid_8700000/8700410.stm, 3 pages.
"Streetmuseum' Museum of London App Offers a New Perspective on the Old," https://www.trendhunter.com/trends/streetmuseum-museum-of-london-app, 6 pages.
"Museum of London 'StreetMuseum' by Brothers and Sisters," https://www.campaignlive.co.uk/article/museum-london-streetmuseum-brothers-sisters/1003074, 11 pages.
Zhang, "Museum of London Releases Augmented Reality App for Historical Photos," https://petapixel.com/2010/05/24/museum-of-london-releases-augmented-reality-app-for-historical-photos/, 11 pages.
Lister, "Turf Wars and Fandango among this week's free iPhone apps," https://www.newsreports.com/turf-wars-and-fandango-among-this-week-s-free-iphone-apps/, 6 pages.
McCavitt, "Turf Wars iPhone Game Review," https://web.archive.org/web/20100227030259/http://www.thegamereviews.com:80/article-1627-Turf-Wars-iPhone-Game-Review.html, 2 pages.
"Turf Wars Captures Apple's iPad," old.gamegrin.com/game/news/2010/turf-wars-captures-apples-ipad, downloaded on Feb. 5, 2021, 2 pages.
James, "Turf Wars (iPhone GPS Game) Guide and Walkthrough," https://web.archive.org/web/20120114125609/http://gameolosophy.com/games/turf-wars-iphone-gps-game-guide-and-walkthrough, 3 pages.
Rachel et al., "Turf Wars' Nick Baicoianu—Exclusive Interview," https://web.archive.org/web/20110101031555/http://www.gamingangels.com/2009/12/turf-wars-nick-baicoianu-exclusive-interview/, 7 pages.
Gharrity, "Turf Wars Q&A," https://web.archive.org/web/20110822135221/http://blastmagazine.com/the-magazine/gaming/gaming-news/turf-wars-qa/, 11 pages.
"Introducing Turf Wars, the Free, GPS based Crime Game for Apple iPhone," https://www.ign.com/articles/2009/12/07/introducing-turf-wars-the-free-gps-based-crime-game-for-apple-iphone, 11 pages.
"Turf Wars," https://web.archive.org/web/20100328171725/http://itunes.apple.com:80/app/turf-wars/id332185049?mt=8, 3 pages.
Zungre, "Turf Wars Uses GPS to Control Real World Territory," https://web.archive.org/web/20110810235149/http://www.slidetoplay.com/story/turf-wars-uses-gps-to-control-real-world-territory, 1 page.
"Turf Wars," https://web.archive.org/web/20101220170329/http://turfwarsapp.com/, 1 page.
"Turf Wars News," https://web.archive.org/web/20101204075000/hltp://turfwarsapp.com/news/, 5 pages.
"Turf Wars Screenshots," https://web.archive.org/web/20101204075000/http://turfwarsapp.com/news/, 5 pages.
Broida, "UFO on Tape: The game of close encounters," https://www.cnet.com/news/ufo-on-tape-the-game-of-close-encounters/, 7 pages.
Buchanan, "UFO on Tape Review," https://www.ign.com/articles/2010/09/30/ufo-on-tape-review, 7 pages.
Nesvadba, "UFO on Tape Review," https://www.appspy.com/review/4610/ufo-on-tape, 3 pages.
Barry, "Waze Combines Crowdsourced GPS and Pac-Man," https://www.wired.com/2010/11/waze-combines-crowdsourced-gps-and-pac-man/, 2 pages.
Dempsey, "Waze: Crowdsourcing traffic and roads," https://www.gislounge.com/crowdsourcing-traffic-and-roads/, 10 pages.

(56) References Cited

OTHER PUBLICATIONS

Forrest, "Waze: Make Your Own Maps in Realtime," http://radar.oreilly.com/2009/08/waze-make-your-own-maps-in-rea.html, 4 pages.
Forrest, "Waze: Using groups and gaming to get geodata," http://radar.oreilly.com/2010/08/waze-using-groups-and-gaming-t.html, 3 pages.
Furchgott, "The Blog; App Warns Drivers of the Mayhem Ahead," https://archive.nytimes.com/query.nytimes.com/gst/fullpage-9B07EFDC1E3BF930A25751C0A967908B63.html, downloaded on Feb. 17, 2021, 2 pages.
Ha, "Driving app Waze turns the highway into a Pac-Man game with 'Road Goodies'," https://venturebeat.com/social/driving-app-waze-turns-the-highway-into-a-pac-man-style-game-with-road-goodies/, 4 pages.
Rogers, "Review: Waze for the iPhone," isource.com/2010/08/30/review-waze-for-the-iphone/, downloaded on Feb. 17, 2021, 22 page.
Fox, "What is Wherigo?," https://forums.geocaching.com/GC/index.php?/topic/241452-what-is-wherigo/, 4 pages.
Lenahan, "Create Exciting GPS Adventure Games With Wherigo," https://www.makeuseof.com/tag/create-gps-adventure-games-wherigo/?utm_source=twitterfeed&utm_medium=twitter, 15 pages.
"Wherigo Advanced Concepts," https://www.wherigo.com/tutorial/advanced.html, 8 pages.
"Developers—Download Wikitude API," https://web.archive.org/web/20110702200814/http://www.wikitude.com/en/developers, 8 pages.
Hauser, "Wikitude World Browser," https://web.archive.org/web/20110722165744/http:/www.wikitude.com/en/wikitude-world-browser-augmented-reality, 5 pages.
Madden, "Professional augmented reality browsers for smartphones: programming for junaio, layar and wikitude," 2011, 345 pages.
Chen, "Yelp Sneaks Augmented Reality Into iPhone App," https://www.wired.com/2009/08/yelp-ar/, 2 pages.
Herrman, "Augmented Reality Yelp Will Murder All Other iPhone Restaurant Apps, My Health," https://gizmodo.com/augmented-reality-yelp-will-murder-all-other-iphone-res-5347194, 5 pages.
"Easter Egg: Yelp Is the iPhone's First Augmented Reality App," https://mashable.com/2009/08/27/yelp-augmented-reality/, downloaded Feb. 5, 2021, 10 pages.
Metz, "'Augmented reality' comes to mobile phones," https://www.nbcnews.com/id/wbna33165050, 10 pages.
Mortensen, "New Yelp App Has Hidden Augmented Reality Mode," https://www.cultofmac.com/15247/new-yelp-app-has-hidden-augmented-reality-mode, 5 pages.
Schramm, "Voices that Matter iPhone: How Ben Newhouse created Yelp Monocle, and the future of AR," https://www.engadget.com/2010-04-26-voices-that-matter-iphone-how-ben-newhouse-created-yelp-monocle.html, 7 pages.
Hand, "NYC Nearest Subway AR App for iPhone 3GS," https://vizworld.com/2009/07/nyc-nearest-subway-ar-app-for-iphone-3gs/, 7 pages.
"Acrossair Augmented Reality Browser," https://appadvice.com/app/acrossair-augmented-reality/348209004, 3 pages.
Schwartz, "Lost in the Subway? Use AcrossAir's Augmented Reality iPhone App," https://www.fastcompany.com/1311181/lost-subway-use-acrossairs-augmented-reality-iphone-app?itm_source=parsely-api, 8 pages.
Hartsock, "Acrossair: Getting There Is Half the Fun," https://www.technewsworld.com/story/70502.html, downloaded on Mar. 12, 2021, 5 pages.
"AugmentedWorks—iPhone Apps Travel Guide with AR: Augmented GeoTravel 3.0.0," https://web.archive.org/web/20110128180606/http://augmentedworks.com/, 3 pages.
"Augmented GeoTravel—Features," https://web.archive.org/web/20100909163937/http://www.augmentedworks.com/en/augmented-geotravel/features, 2 pages.
Julier et al., "BARS: Battlefield Augmented Reality System," Advanced Information Technology (Code 5580), Naval Research Laboratory, 2000, 7 pages.
Baillot et al., "Authoring of Physical Models Using Mobile Computers," Naval Research Laboratory, 2001, IEEE, 8 Pages.
Cheok et al., "Human Pacman: a mobile, wide-area entertainment system based on physical, social, and ubiquitous computing," Springer-Verlag London Limited 2004, 11 pages.
Davidson, "Pro Java™ 6 3D Game Development Java 3D JOGL, Jinput, and JOAL APIs," APRESS, 508 pages.
Boger, "Are Existing Head-Mounted Displays 'Good Enough'?," Sensics, Inc., 2007, 11 pages.
Boger, "The 2008 HMD Survey: Are We There Yet?" Sensics, Inc., 2008, 14 pages.
Boger, "Cutting the Cord: the 2010 Survey on using Wireless Video with Head-Mounted Displays," Sensics, Inc., 2008, 10 pages.
Bateman, "The Essential Guide to 3D in Flash," 2010, Friends of Ed—an Apress Company, 275 pages.
Guan, "Spherical Image Processing for Immersive Visualisation and View Generation," Thesis Submitted to the University of Central Lancashire, 133 pages.
Magerkurth, "Proceedings of PerGames—Second International Workshop on Gaming Applications in Pervasive Computing Environments," www.pergames.de., 2005, 119 pages.
Avery, "Outdoor Augmented Reality Gaming on Five Dollars a Day," www.pergames.de., 2005, 10 pages.
Ivanov, "Away 3D 3.6 Cookbook," 2011, PAKT Publishing, 480 pages.
Azuma et al., "Recent Advances in Augmented Reality," IEEE Computer Graphics and Applications, 14 pages.
Azuma, "A Survey of Augmented Reality," Presence: Teleoperators and Virtual Environments, 48 pages.
Azuma, "The Challenge of Making Augmented Reality Work Outdoors," In Mixed Reality: Merging Real and Virtual Worlds. Yuichi Ohta and Hideyuki Tamura (ed.), Springer-Verlag, 1999. Chp 21 pp. 379-390, 10 pages.
Bell et al., "Interweaving Mobile Games With Everyday Life," Proc. ACM CHI, 2006, 10 pages.
Bonamico, "A Java-based MPEG-4 Facial Animation Player," Proc Int Conf Augmented Virtual Reality& 3D Imaging, 4 pages.
Broll, "Meeting Technology Challenges of Pervasive Augmented Reality Games," ACM, 2006, 13 pages.
Brooks, "What's Real About Virtual Reality?," IEEE, Nov./Dec. 1999, 12 pages.
Julier et al., " The Need for AI: Intuitive User Interfaces for Mobile Augmented Reality Systems," 2001, ITT Advanced Engineering Sytems, 5 pages.
Burdea et al., "Virtual Reality Technology: Second Edition," 2003, John Wiley & Sons, Inc., 134 pages.
Butterworth et al., "3DM: A Three Dimensional Modeler Using a Head-Mounted Display," ACM, 1992, 5 pages.
Lee et al., "CAMAR 2.0: Future Direction of Context-Aware Mobile Augmented Reality," 2009, IEEE, 5 pages.
Cheok et al., "Human Pacman: A Mobile Entertainment System with Ubiquitous Computing and Tangible Interaction over a Wide Outdoor Area," 2003, Springer-Verlag, 16 pages.
Hezel et al., "Head Mounted Displays For Virtual Reality," Feb. 1993, MITRE, 5 pages.
McQuaid, "Everquest Shadows of Luclin Game Manual, "2001, Sony Computer Entertainment America, Inc. , 15 pages.
"Everquest Trilogy Manual," 2001, Sony Computer Entertainment America, Inc., 65 pages.
Kellner et al., "Geometric Calibration of Head-Mounted Displays and its Effects on Distance Estimation," Apr. 2012, IEEE Transactions On Visualization and Computer Graphics, vol. 18, No. 4, IEEE Computer Scociety, 8 pages.
L. Gutierrez et al., "Far-Play: a framework to develop Augmented/Alternate Reality Games," Second IEEE Workshop on Pervasive Collaboration and Social Networking, 2011, 6 pages.
Feiner et al., "A Touring Machine: Prototyping 3D Mobile Augmented Reality Systems for Exploring the Urban Environment," InProc ISWC '97 (Int. Symp. on Wearable Computing), Cambridge, MA, Oct. 13-14, 1997, pp. 74-81, 8 pages.
Fisher et al., "Virtual Environment Display System," Oct. 23-24, 1986, ACM, 12 pages.

(56) References Cited

OTHER PUBLICATIONS

Fuchs et al., "Virtual Reality: Concepts and Technologies," 2011, CRC Press, 132 pages.
Gabbard et al., "Usability Engineering: Domain Analysis Activities for Augmented Reality Systems," 2002, The Engineering Reality of Virtual Reality, Proceedings SPIE vol. 4660, Stereoscopic Displays and Virtual Reality Systems IX, 13 pages.
Gledhill et al., "Panoramic imaging—a review," 2003, Elsevier Science Ltd., 11 pages.
Gotow et al., "Addressing Challenges with Augmented Reality Applications on Smartphones," Institute for Computer Sciences, Social Informatics and Telecommunications Engineering, 2010, 14 pages.
"GPS accuracy and Layar usability testing," 2010, mediaLABamsterdam, 7 pages.
Gradecki, "The Virtual Reality Construction Kit," 1994, Wiley & Sons Inc, 100 pages.
Heymann et al., "Representation, Coding and Interactive Rendering of High-Resolution Panoramic Images and Video Using MPEG-4," 2005, 5 pages.
Hollands, "The Virtual Reality Homebrewer's Handbook," 1996, John Wiley & Sons, 213 pages.
Hollerer et al., "User Interface Management Techniques for Collaborative Mobile Augmented Reality," Computers and Graphics 25(5), Elsevier Science Ltd, Oct. 2001, pp. 799-810, 9 pages.
Holloway et al., "Virtual Environments: A Survey of the Technology," Sep. 1993, 59 pages.
Strickland, "How Virtual Reality Gear Works," Jun. 7, 2009, How Stuff Works, Inc., 3 pages.
Hurst et al., "Mobile 3D Graphics and Virtual Reality Interaction," 2011, ACM, 8 pages.
"Human Pacman-Wired NextFest," 2005, Wired.
Cheok et al., "Human Pacman: A Sensing-based Mobile Entertainment System with Ubiquitous Computing and Tangible Interaction," 2000, ACM, 12 pages.
Basu et al., "Immersive Virtual Reality On-The-Go," 2013, IEEE Virtual Reality, 2 pages.
"Inside QuickTime—The QuickTime Technical Reference Library—QuickTime VR," 2002, Apple Computer Inc., 272 pages.
Bayer et al., "Chapter 3: Introduction to Helmet-Mounted Displays," 62 pages.
Iovine, "Step Into Virtual Reality", 1995, Windcrest/McGraw-Hill, 106 pages.
Jacobson et al., "Garage Virtual Reality," 1994, Sams Publishing, 134 pages.

\* cited by examiner

AUGMENTED REALITY OBJECT MANAGEMENT SYSTEM

This application is a continuation of U.S. application Ser. No. 18/206,976 filed Jun. 7, 2023 which is a continuation of U.S. application Ser. No. 17/972,504 filed Oct. 24, 2022 which is a continuation of U.S. application Ser. No. 17/386,410 filed Jul. 27, 2021 which is a continuation of U.S. application Ser. No. 16/926,485 filed Jul. 10, 2020, which is a continuation of U.S. application Ser. No. 16/557,963 filed Aug. 30, 2019, which is a continuation of U.S. application Ser. No. 16/186,405 filed Nov. 9, 2018, which is a continuation of U.S. application Ser. No. 15/786,242 filed Oct. 17, 2017, which is a continuation of U.S. application Ser. No. 15/213,113 filed Jul. 18, 2016, which is a continuation of U.S. application Ser. No. 14/329,882 filed Jul. 11, 2014, which is a divisional of U.S. patent application Ser. No. 13/173,244, filed on Jun. 30, 2011, now U.S. Pat. No. 8,810,598, which claims the benefit of priority to U.S. Provisional Application having Ser. No. 61/473,324 filed on Apr. 8, 2011, which are hereby incorporated by reference in their entirety. U.S. patents and U.S. patent application publications discussed herein are hereby incorporated by reference in their entirety. Non-patent publications discussed herein are hereby incorporated by reference to the extent permitted by 37 CFR § 1.57(e). Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is augmented reality technologies.

BACKGROUND

Augmented reality represents a presentation of virtual objects along side real-world elements. Individuals can experience or interact with augmented realities according to the rules defined by the reality designers. Individuals tap into augmented reality content via cell phones, mobile computing platforms, or other AR-capable devices. Augmented reality continues to encroach rapidly on every day life while the amount of augmented reality content continues to grow at an alarming rate. Individuals are easily overwhelmed by the growing excess of available augmented reality content.

Consider one augmented reality service, BUMP.com. BUMP.com offers access to annotations bound to individual license plates as described in the Wall Street Journal™ web articled titled "License to Pry", published on Mar. 10, 2011 (see URL blogs.wsj.com/digits/2011/03/10/a-license-to-pry). BUMP.com allows individuals to send images of license plates to the BUMP.com service. The service in turn attempts to recognize the license plate and returns annotations left by others for the same plate. Users of the system require a dedicated application to interact with the content. BUMP.com only supports providing access to their available content via their application.

Layar™ of Amsterdam, The Netherlands, (see URL www.layer.com) makes further strides in presenting augmented reality by offering access to multiple augmented reality layers where each layer is distinct or separate from other layers. A user can select which layer where layers are published by one or more third party developers. Even though Layar provides an application allowing users to select content provided by multiple third parties, the user is required choose a layer via the Layar application. Furthermore, the user is presented with single purpose content rather than experiencing augmented reality as naturally as one would experience the real-world. In the coming world of ever-present augmented reality, users should be able to seamlessly access or interact with augmented reality content as naturally as they would interact with real-world elements.

Some progress has been made over the last few years toward creating a seamless integration between user and augmented reality environments. For example, U.S. patent application publication 2006/0047704 to Gopalakrishnan titled "Method and System for Providing Information Service Relevant to Visual Imagery", filed Aug. 30, 2005, discusses presenting embedded information services for an augment reality experience based on a context. Yet another example includes U.S. patent application publication 2009/0167787 to Bathiche et al. titled "Augment Reality and Filtering", filed Dec. 28, 2007, offers deeper insight in providing an enhanced user experience based on a context. Bethiche discusses that virtual capabilities can be interspersed with real-world situations where the virtual data can be filtered, ranked, modified, or ignored based on a context. In a similar vein, U.S. patent application publication 2010/0257252 to Dougherty titled "Augmented Reality Cloud Computing", filed Apr. 1, 2009, also describes providing overlay information considered pertinent to a user's surrounding environment. Although useful for providing an enriched experience for users based on context, the user still must interact with a dedicated augmented reality system. U.S. Pat. No. 7,529,639 to Rasanen et al. titled "Location-Based Novelty Index Value and Recommendation System and Method", filed Mar. 4, 2008, describes using location and an inferred context to generate recommendations for a user. The above references also fail to appreciate that objects within an environment or scene can interfere with each other to give rise to an augmented reality experience.

From the perspective of presenting augmented reality context, to some degree U.S. Pat. No. 7,899,915 to Reisman titled "Method and Apparatus for Browsing Using Multiple Coordinated Device Sets", filed May 8, 2003, appreciates that multiple devices can be utilized by a user. Reisman's approach allows a user to switch among display or presentation devices when interacting with hypermedia. Unfortunately, Reisman merely handles the user's side of a rich media interaction and fails to appreciate that a user's experience is also impacted by the underlying dedicated augmented reality infrastructure or by interference among elements of a scene.

U.S. Pat. No. 7,904,577 to Taylor titled "Data Transmission Protocol and Visual Display for a Networked Computer System", filed Mar. 31, 2008, provides some support for virtual reality gaming through a protocol supporting multiple players. Even further, U.S. Pat. No. 7,908,462 to Sung titled "Virtual World Simulation Systems and Methods Utilizing Parallel Coprocessors, and Computer Program Products Thereof", filed Jun. 9, 2010, contemplates hosting a virtual work on parallel processing array of graphic processors or field-programmable gate arrays. Although focused on providing infrastructure, the contemplated infrastructures still requires the user to interact with a dedicated augmented reality system.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Strangely, known approaches for providing augmented reality content treat augment reality platforms as silos of virtual worlds or objects where each company develops their own hosting infrastructure to provide augmented reality services to users. Such approaches fail to allow individuals to move seamlessly from one augmented reality to another as naturally as moving from one room in a building to another. Furthermore, existing infrastructures fail to treat augmented reality objects as distinct manageable objects in an infrastructure agonistic manner, where an augmented reality infrastructure can also be a pervasive utility. For example, in the developed world electricity is ubiquitous or more aptly internet connectivity is ubiquitous. Augmented realities would benefit from similar treatment.

In a world of ubiquitous augmented realities or associated augmented reality objects where individuals interact with the augmented realities in a seamless fashion, individuals still require presentation of relevant augmented reality content especially when features, real or virtual, of an augmented reality can interfere with each other. As discussed above with respect to references presenting information based on a context, the same references fail to address interference among augmented realities or elements, real or virtual, participating in an augmented reality experience. Interestingly, known art seeks to avoid interference among elements of the augmented reality by simply forcing individuals to select which features to experience. The known art fails to appreciate that interference among elements can occur based on properties or attributes of the elements. Interference is more than mere a filtering mechanism. Interference represents ambient interplay among present, or relevant, elements in a scene that gives rise to an augmented reality experience through constructive or destructive interference.

What has yet to be appreciated is one or more augmented realities can be hosted by a common hosting infrastructure, the networking infrastructure itself for example, or that augmented reality objects can be distinct from the hosting platform. For example, the Applicant has appreciated, as discussed below, networking nodes within a networking fabric can provide augmented reality objects or other virtual constructs to edge AR-capable devices (e.g., cell phones, kiosks, tablet computers, vehicles, etc.). As the edge devices, or other devices for that matter, interact with the networking fabric by exchanging data, the fabric can determine which augmented reality objects are most relevant or even which augmented reality itself is most relevant for the device based on context derived from observed real-world elements. Augmented reality context can now be used to determine how elements in a scene, a location relevant to an individual, can interfere with each other to give rise to relevant augmented reality experiences.

Thus, there is still a need for interference based augmented reality platforms.

SUMMARY OF THE INVENTION

The inventive subject matter provides apparatus, systems and methods in which one can utilize an augmented reality (AR) hosting platform to give rise to an augmented reality experience based on interference among elements of a digital representation of a scene. One aspect of the inventive subject matter includes an AR hosting platform. Contemplated hosting platforms comprise a mobile device interface through which the platform can obtained a digital representation of a scene, possibly local to the mobile device (e.g., cell phone, vehicle, tablet computer, PDA, AR-capable device, etc.). The digital representation can include data representing one or more elements of the scene. In some embodiments, the data includes sensor data captured by the mobile device, other sensing devices proximate to the scene, or devices capable of capturing data relevant to the scene. The platform can further include an object recognition engine in communication with the mobile device interface and able analyze the digital representation to recognize one or more elements of the scene as one or more target objects. The object recognition engine can further determine a context related to the scene based on the digital representation and pertaining to the target object. Further, the engine can identify a set of relevant AR objects from available AR objects with respect to the context based on a derived interference among elements (e.g., real-world elements, virtual elements, etc.). In more preferred embodiments the derived interference forms criteria through which an AR experience is presented to an individual via the mobile device. The object recognition engine can also configure one or more remote devices to allow an interaction with a member object of the set of relevant AR objects according to the derived interference. In especially preferred embodiments, the interaction involves participating in a commercial transaction with a commerce engine. For example, an individual can purchase the member object or even a real-world object participating within the augmented reality.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
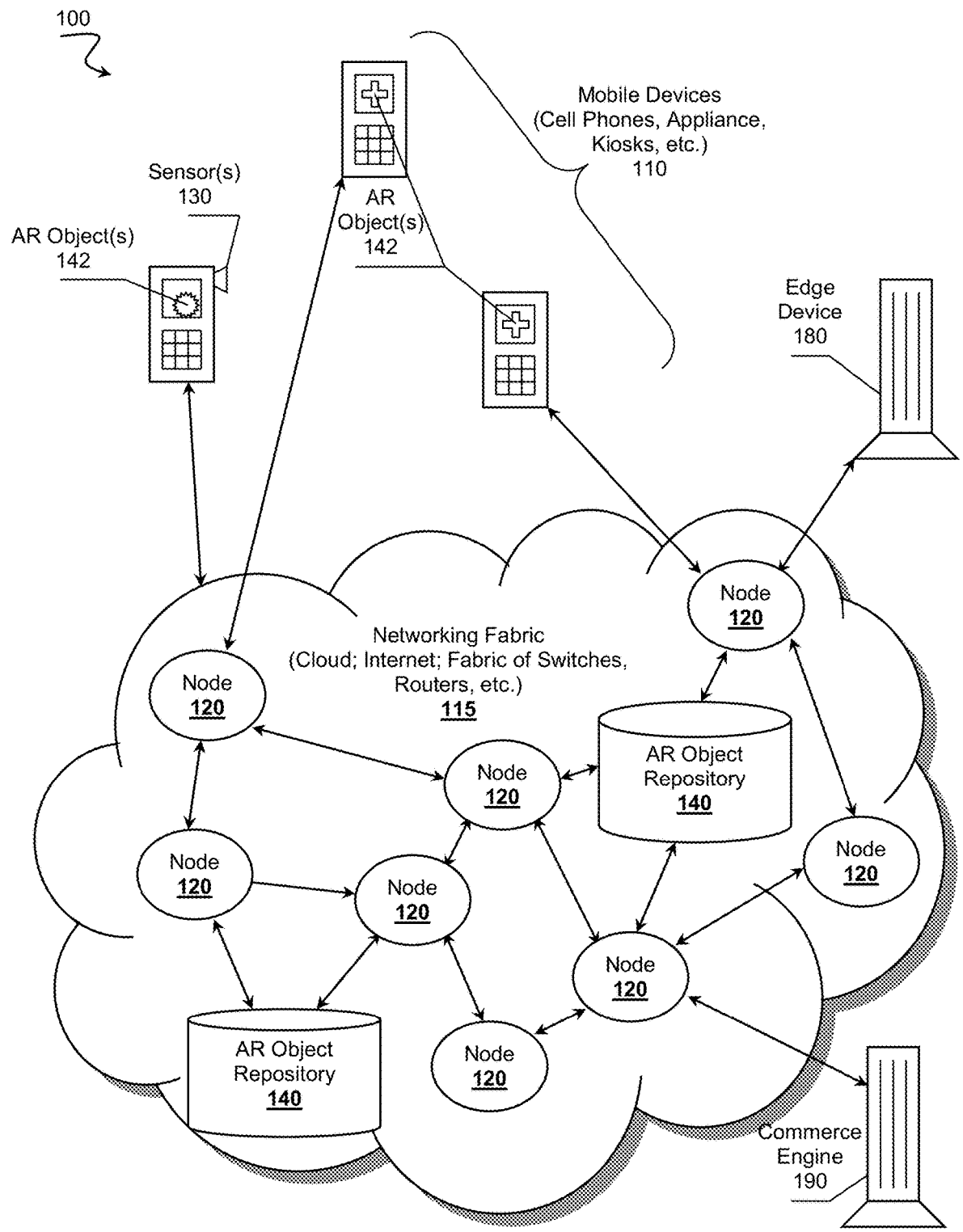
FIG. 1 is a schematic of an augmented reality ecosystem.

It should be noted that while the following description is drawn to a computer/server based augmented reality platform, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing an AR hosting infrastructure capable of configuring remote device to interact with AR object objects. For example, contemplated infrastructures determine a relevant augmented reality context from environment data representing a real-world environment local to an AR-capable device and instruct the device to interact with other AR-capable devices, AR objects, real-world objects participating in an augmented reality, or other objects considered to be pertinent to the germane augmented reality.

The following discussion provides many example embodiments of the inventive subject matter. Although each embodiment represents a single combination of inventive elements, the inventive subject matter is considered to include all possible combinations of the disclosed inventive elements. Thus if one embodiment comprises inventive elements A, B, and C, and a second embodiment comprises inventive elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Overview

AR object interference can be considered to mirror, or otherwise simulation, interference among electromagnetic waves, light for example. Interference among waves occurs when two or more waves interact at a location or a time in a manner where they enhance their presence (i.e., constructive interference) or suppress their presence (i.e., destructive interference) at the location. Interference among waves occurs due to interacting properties of the waves, amplitude or phase for example. The metaphor of interference can be extended to augmented realities where elements participating in the augmented reality can have properties that interfere with each other to enhance or suppress presence of relevant AR objects.

The following discussion presents the inventive subject matter within the context of networking nodes or a networking fabric as a whole operating as an AR hosting platform. Still, one should appreciate that the inventive subject matter directed to interference can also be applied to more traditional server implementations. Servers can be dedicated hardware or can operate within the network cloud, possibly operating within one or more virtual machines.

In FIG. 1 AR ecosystem 100 provides an overview of an AR environment in which AR-capable device 110 can have interactions with one or more AR objects 142. AR ecosystem 100 comprises networking fabric 115 comprised of a plurality of interconnected networking nodes 120 forming a communication fabric allowing edge devices 180 to exchange data across the fabric 115. In some embodiments, fabric 115 can further include one or more databases including AR object repositories 140 storing AR objects 142, preferably network addressable AR objects. AR-capable devices 110 interact with fabric 115 through exchanging device data, which can include data representative of an environment or scene local to the devices. For example, the device data can include a digital representation of a real-world scene where the digital representation can comprises sensor data, raw or preprocessed, acquired by sensors 130 local to AR-capable devices 110 or acquired other sensor enabled devices. For example, digital representation can comprise sensor data acquired by a mobile device (e.g., cell phone, tablet computer, etc.) or even from multiple mobile devices. The infrastructure can include an AR device interface (e.g., port, API, networking node, HTTP servers, etc.) through which fabric 115 can exchange device data with AR-capable device 110. As desired, networking nodes 120 can derive an address of AR object 142 based on the exchanged device data, or other environment data, and present one or more AR objects 142 to the AR-capable devices 110. In more preferred embodiments, AR-capable devices 110 can conduct interactions with AR objects 142 including conducting a commercial transaction associated with the AR objects 142 with commerce engine 190 (e.g., banking system, credit card processing, account balance change, frequent flyer mileage exchange, reward programs, etc.).

AR-capable devices 110 typically represent one or more types of edge devices 180 relative to networking fabric 115. Example AR-capable devices 110 include mobile devices, cell phones, gaming consoles, kiosks, vehicles (e.g., car, plane, bus, etc.), appliances, set top boxes, portable computer, or other computing devices suitably configured to present augmented content to a user. Augmented content preferably comprises data capable of being presented according to a user's available sense modalities (e.g., visual, audio, tactile, tastes, olfactory, etc.). One should appreciate that the augmented content can be converted to the user's available sense modalities as desired to compensate for a user's disability. For example, visual AR objects 142 can be presented to a visually impaired person via a tactile presentation interface.

AR-capable devices 110 can comprise one or more sensors 130 capable of acquiring environment data proximate to a user or the corresponding AR-capable device 110. Contemplated sensors 130 can include optical sensors, microphones, accelerometers, magnetometers, GPS, thermometers, bio sensors, weather sensors, or other types of sensors. Sensors 130 can be integral with AR-capable device 110 as shown, could be local to the AR-capable device 110, or even remote from the location of the AR-capable device 110. For example, a satellite can include sensors 130 where the satellite captures data relevant to the scene local to the AR-capable device 110.

In some embodiments, sensors 130 collect data local to a user within a personal area network (PAN) where the AR-capable device 110 operates as a sensor hub. The sensor hub aggregates the sensor data and exchanges the sensor data with networking fabric 115. For example, the user could wear sensors 130 as part of their clothing, within their shoes, or in their hat to collect brain signals. In such embodiments, sensors 130 can exchange data with other elements within the PAN via wired or wireless connections (e.g., Bluetooth, WiGIG, Wi-Fi, Zigbee, etc.). Example sensor data includes medical data, position data, orientation data, bio-metric data, image data, audio data, haptic data, acceleration data, proximity data, temperature data, or other types of data capable of being captured by a sensor. Furthermore, the digital representation of the scene can include bio-sensor data, or other health-related data, from multiple individual sensors. Regardless of the type of data collected, the data can represent a digital representation of a scene where the digital representation can include raw data, processed data, metadata, or other types of data representative of a real-world environment.

Networking nodes 120 preferably obtain environment data related to a real-world scene of AR-capable device 110. The environment data can include a broad spectrum of data reflecting the real-world environment. As discussed above, the environment data can include sensor data comprising a digital representation of the environment or scene where the sensor data is acquired by AR-capable device 110. In addition, the environment data can comprise external data obtained from a source other than AR-capable device 110. For example, the environment data could include data obtained from a weather station, a surveillance camera, another cell phone, a web server, a radio station, a satellite, or other sources configured to provide environment data.

The digital representation of a scene can comprises environment data extending beyond just sensor data. Environment data can also include AR data reflecting a currently presented augmented reality or relevant AR objects 142. For example, the environment data could include information relating to the proximity of AR-capable device 110 to virtual objects. Further, the environment data can comprise information relating to the operation of AR-capable device 110 itself. Examples include networking metrics, user identity or demographics, installed software or firmware, or other types of environment data. Thus one can considered the digital representation of the scene to be encompassing many aspects of the scene, including encompassing individuals participating within the scene, physical environment of the scene, augmented aspects of the scene, or even aspects beyond normal human perception (e.g., networking metrics, etc.).

Networking fabric 115 is depicted as a cloud of interconnected networking nodes 120, the Internet for example or a cloud computing infrastructure (e.g., Amazon EC2™, Google™ Rackspace™, etc.). One should appreciate fabric 115 is a communication infrastructure allowing edge devices 180 to exchange data with each other in a general purpose fashion. In addition, fabric 115 can provide a platform from which one or more AR objects 142 can be presented to AR-capable devices 110. Networking nodes 120 composing network fabric 115 preferably comprise computing devices able to direct data traffic from one port on the node to other port. Example networking nodes 120 include routers, hubs, switches, gateways, firewalls, access points, or other devices capable of forwarding or routing traffic. The fabric can include a homogenous mix or a heterogeneous mix of node types. In some embodiments, the fabric can extend into AR-capable devices 110, possibly in environments where AR-capable device 110 operates as a sensor hub within a PAN. Fabric 115 can further comprise one or more types of networks including the Internet, a LAN, a WAN, a VPN, a WLAN, peer-to-peer networks, cloud-based system, ad hoc networks, mesh networks, or other types of networks.

More preferred embodiments include one or more AR object repositories 140 storing available AR objects 142. AR objects 142 can be stored as distinct manageable objects capable of being addressed from other nodes 120, edge devices 180, commerce engine 190, AR-capable devices 110, or even from other AR objects 142. Preferably AR objects 142 have one or more object attributes, which are considered metadata representing information related to the corresponding AR object 142. For example, the object attributes can include information about object properties that can interfere with other properties within a given AR experience context.

Object attributes can be bound to AR objects 142 as desired. In some embodiments, the object attributes conform to one or more standardized namespaces allowing various network nodes 120, servers, agents, AR-capable devices 110, or other components of the system to compare one AR object 142 to other types of objects in the system (e.g., contexts, AR objects, elements, target objects, etc.). The normalized namespaces can be defined as a global namespace that pertains to all elements including real-world objects or AR objects 142. It is also contemplated that object attributes can be defined for specific contexts. For example a gaming context could have its own namespace, which could be distinct from a shopping or traveling context. Furthermore, each type of context can have distinct namespaces or sub-namespaces possibly corresponding to an AR content publisher. A first game publisher might assign attributes to their own AR objects 142 according to their own proprietary namespace while a second game publisher might utilize a common, normalized gaming context namespace.

Contexts can take on many different forms and can be defined as desired. Within AR ecosystem 100, contexts can be treated as manageable objects. For example, a context object can be replicated or moved from one of node 120 to another. Positing context objects allows each node 120 to access to most relevant contexts when required. Contexts can be assigned names, identifiers, or other context attributes representing metadata describing the context or its use. Example context attributes can include context name, identifiers (e.g., address of context, GUID, UUID, URL, etc.), classification of a context, owner of context, publisher of the context, revision of the context, or other information. In more preferred embodiments a context object also comprises an attribute signature quantifying the relevance of a context with respect to a scene or elements of the scene. The signature can be represented by criteria or rules operating on attributes within a normalized attribute namespaces. Contexts can also belong to one more classifications or types of context. Example types of contexts can include a gaming context, a shopping context, a traveling context, a working context (e.g., job, occupation, activity, etc.), an entertainment context, or other categories.

One should appreciate that AR objects 142 can remain resident at their respective repository 140 without requiring submitting queries for the AR objects. Repositories 140 can be configured to disseminate object attributes of AR objects 142 among networking nodes 120. In such embodiments networking nodes 120 need only compare object attributes derived from the digital representation of the scene or known AR object attributes to determine if an AR object 142 is of relevance to a context. Once identified, the address of AR object 142 can be derived or otherwise acquired to find the AR object 142. Methods of addressing AR objects 142 are discussed further below.

AR repositories 140 are illustrated as separate databases located within networking fabric 115. In some embodiments, it is considered advantageous to house AR objects 142 in a segregated fashion. For example, one vendor or publisher of AR objects 142 might wish to retain control over their objects. The publisher can provide access to their repository for a fee. However, it is also considered advantageous to allow mixing of AR objects in a general purpose repository. Such an approach allows for migrating AR objects 142 from one repository 140 or node 120 to another as desired, possibly based on aggregated contexts from multiple scenes or multiple devices 110. Furthermore, one or more of AR repositories 140 could comprise a distributed repository where AR objects 142 are spread across multiple hosting components within the system. For example, a single AR repository 140 could be distributed across memories of multiple networking nodes 120. Each portion of the AR repository can be addressed within the same addressing space regardless of their location.

When an AR object 142 has been identified, the networking node can obtain the object from its location within the AR repository 140. Networking node 120 can forward or otherwise make AR object 142 available to AR-capable device 110. AR-capable devices 110 can be configured to have one or more interactions with AR object 142 according to the design of the AR object, context, or interference. In the example shown, the same AR object, "+", is presented on two of AR-capable devices 110 to illustrate that an AR object can be shared or can be commonly presented because the devices have sufficiently similar contexts; perhaps the devices are owned by players of a shared game or AR experience. However, another AR object, "*", is presented on a distinct AR-capable device 110 to illustrate that one could still have a distinct context from other local devices, possibly based on device use, user identity or preferences, authorization, authentication, interference among other elements in AR ecosystem 100, or other attributes.

Networking nodes 120 configure AR-capable device 110 to allow an interaction with the AR object 142. In some embodiment, the interaction comprises a presentation of AR object 142 via a display, speaker, tactile interface or other interface depending on the nature of AR object 142. AR objects 142 can also include executable instructions that can be executed by the AR-capable device 110 or even executed on networking nodes 120. The instructions can represent functionality associated with AR object 142. For example, a person might be within the vicinity of a vending machine. A corresponding AR object 142 is presented as a purchasable product to the user where the networking node house the functionality of conducting a transaction associated with the vending machine. The transaction functionality could also be located as part of AR object 142, associated with a context, integrated with AR capable device 110, remote servers or services, or other suitability configured device. Once the person leaves the vicinity, or meets other suitable criteria, the networking node can remove the code or AR object 142 based on a newly derived context or even on a change from one context to another.

Although AR objects 142 are presented in a visual format, one should appreciate that AR objects 142 can include other modalities including audio formats, haptic formats, or other formats conforming to the human senses. One should further appreciate that AR object 142 can represent objects beyond the human senses where the object's features have been converted to align with the human senses. For example, AR object 142 could instruct AR-capable device 110 to present a non-visible temperature gradient as a visible temperature contour superimposed on a real-world image of a landscape where the temperature contours are derived from an array of sensors 130, possibly within other AR-capable devices 110 or proximate to the landscape.

Hosting Platform

Figure 2:
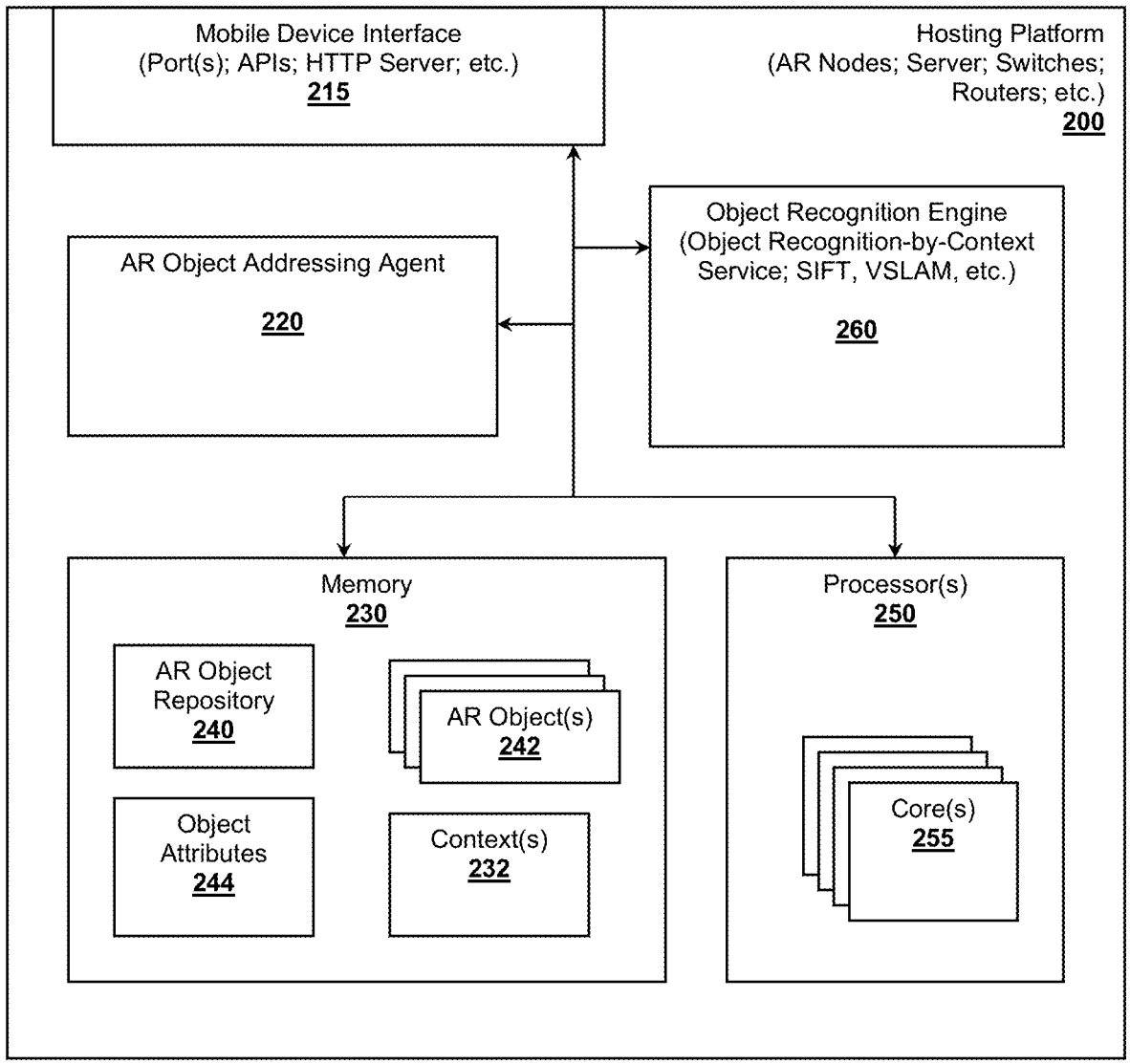
FIG. 2 is a schematic of an augmented reality hosting platform.

In FIG. 2, example hosting platform 200 is presented. Although the hosting platform 200 is presented as a networking switch for the sake of discussion, hosting platform 200 could also include other types of networking infrastructure. A few examples of networking nodes that can be suitably adapted for use with the inventive subject matter include servers, routers, hubs, firewalls, gateways, name servers, proxies, access points, hot spots, or other devices capable operating as a computing device within a networking environment. In more preferred embodiments, hosting platform 200 is considered to include networking devices capable of receiving a packet and forwarding the packet on to its indented destination, regardless if the packets are associated with an augmented reality. Still, the inventive subject matter can also be applied toward more traditional computing devices including servers, clients, peers, game consoles, hand-held gaming devices, or other types of computing devices.

In the example shown, hosting platform 200 comprises a device interface 215 through which hosting platform 200, or the fabric in general, is able to interface with AR-capable devices. In embodiments where hosting platform 200 comprises a networking switch, device interface 215 can include one or more ports physically located on the networking switch. The ports can include wired ports (e.g., Ethernet, optic fiber, serial, USB, Firewire, HiGig, SerDes, XAUI, PCI, etc.) or other types of ports requiring a physical connection. Although a port can be a wired port, one should keep in mind that the AR-capable device does not necessarily have to connect directly with the networking node. The ports can also comprise one or more wireless ports (e.g., WUSB, 802.11, WiGIG, WiMAX, GSM, CDMA, LTE, UWB, near field, radio, laser, Zigbee, etc.). Device interface 215 could include one or more logical ports, possibly operating as an AR-related API or URL hosted as a web service within the networking node or the cloud. An AR-capable device can then gain access to AR features hosted by hosting platform 200.

Hosting platform 200 preferably operates as a general data transport for one or more edge devices. Additionally, hosting platform 200 can be configured to operate as a general purpose computing platform. In the example shown, the hosting platform 200 includes memory 230 and one or more processors 250, preferably having multiple cores 255. Memory 230 can include volatile or non-volatile memory. Example memories include RAM, flash, hard drives, solid state drives, or other forms of tangible, non-transitory memory. As the hosting platform 200 analyzes a digital representation of a scene or AR object attributes, the data and various attributes can be stored in memory 230. Additionally, memory 230 can store portions of one or more AR repositories 240. AR repositories 240, or other AR objects 242, can be stored in protected areas of memory (e.g., encrypted containers, FIPS 140-2, etc.) to respect digital rights of AR object publishers or owners. Cores 255 within processors 250 can be individually dedicated to routing functions or can be dedicate to AR functionalities, possibly executing instructions associated with one or more of AR objects 242. The Intel® E-series of Xeon processors having 10 cores would be a suitable processor as are many other multi-core processors. For example, one core can monitor or inspect traffic from an AR-capable device. When the traffic satisfies triggering criteria, the core can instantiate augmented reality processing on a second core. The second core can evaluate the traffic as part of a digital representation of the scene to derive additional attributes of interest. The additional attributes can then be used to identify one or more relevant AR objects with respect to networking or communication context 232, or with respect to interference among other elements of the scene. Thus, elements of a scene that are outside ordinary perception of a human (e.g., network traffic, etc.) can interfere with other elements of the scene, real or virtual, that do fall within ordinary perception of a human.

Memory 230 can also store one or more contexts 232 representing known scenarios of relevance to AR objects 242. Contexts 232 are also considered manageable objects having context attribute signatures describing criteria that should be satisfied for a specific context 232 to be relevant. Hosting platform 200 can analyze the digital representation of the scene to generate attributes associated with recognized elements in the scene. One approach outlining use of a context that can be suitable adapted for use with the inventive subject matter includes the techniques described by U.S. patent application publication 2010/0257252 to Dougherty titled "Augmented Reality Cloud Computing", filed Apr. 1, 2009, among other context-based references cited previously.

Hosting platform can also include object recognition engine 260, which can function as a Object Recognition-by-Context Service (ORCS) capable of recognizing real-world elements of a scene as target objects based on the digital representation of the scene. For example, an AR-capable device, or other sensing devices for that matter, can contribute digital data forming a digital presentation of a scene where the scene includes one or more real-world elements. The digital representation of the scene can include image data, medical data, position data, orientation data, haptic data, bio-metric data, or other types of data representative of an environment or objects within the environment.

Object recognition engine 260 can utilize one or more algorithms to recognize elements of scene. Preferably, through the use of ORCS, engine 260 recognizes the elements as target objects. One should appreciate the elements of the scene can include real-world elements or virtual elements. Attributes associated with the elements can include derived attributes obtained during analysis of the digital representation or attributes obtained from the target object. In some embodiments, object attributes 244 can include target object attributes associated with apriori known target objects (e.g., buildings, plants, people, etc.). Example attributes can include features of the objects in the scene (e.g., color, shape, face, size, iris, speech modulations, words, etc.), features of the data itself (e.g., frequencies, image resolution, etc.), or other types of features. Acceptable algorithms including SIFT, SURF, ViPR, VSLAM, or other image processing techniques to identify features of elements in a scene. Acceptable techniques that can be adapted for processing data to identify target objects include those described in U.S. Pat. Nos. 7,016,532; 7,477,780; 7,680,324; 7,565,008; and 7,564,469.

Object recognition engine 260 can use the environment attributes (e.g., known target object attributes, derived attributes, etc.) to recognize one or more objects in the real-world scene. When a target known object is recognized, object information associated with the target object can then be used to determine if any of contexts 232 pertain to the recognized target with respect to the digital representation. The attributes of the recognized target object or other attributes of the environment can be compared with context attribute signature to make the determination. In embodiments where the various types of objects (e.g., AR objects, contexts, elements, target objects, interferences, etc.) in the system have aligned attribute namespaces, the comparison can be performed as a lookup. The comparison can also include ensuring the context attribute signatures are satisfied where satisfaction of the signatures can be based on values of the attributes with respect to requirements or optional conditions of the signatures. For example, a gaming context might require at least a certain number of recognized players to be present within a scene before the gaming context is considered as pertaining to the scene.

Attributes of the target object can be matched with corresponding attributes of context 232. For example, a real-world element (e.g., a person, a vending machine, a kiosk, a sign, etc.) might comprise a game goal. When the game goal is imaged or sensed, object recognition engine 260 recognizes the real-world object as a goal causing the platform 200 to instruct the AR-capable device to present an AR object 242 as a reward. Thus, real-world elements can be correlated with corresponding context 232 based on derived environment attributes, AR object attributes, context attribute signature, or other factors. Upon determining that one or more contexts 232 pertain to recognized elements, object recognition engine 260 can sift through AR objects 242 to identify which of the a totality of AR objects, referenced to a AR actuality, are indeed considered available AR objects 242 pertain to contexts 232. One should appreciate that available AR objects 242 might be considered to pertain to contexts 232. AR actuality is intended to convey the meaning of all existing augmented realities or AR objects that could possibly be presented.

Several noteworthy points should be appreciated. AR repository 240 can include a vast number of actual AR objects 242 that could be accessed based on various contexts 232. However, the number of available AR objects 242 represents a sub-set of the total number of AR objects 242 in the AR actuality. Available AR objects 242 can be considered to represent the fraction of the total AR objects 242 that are accessible based on authorized access to contexts 232, assuming proper authentication. Still further, the set of relevant AR objects 242 represents a portion of available AR objects 242. The set of relevant AR objects 242 are those objects pertaining to context 232. One should further appreciate member objects of the set of relevant AR objects 242 might or might not be presented to an individual. Member objects of the set are presented according to a derived interference among elements of the scene.

One should keep in mind that the memory 230 does not necessarily store AR object 242. Rather memory 230 of platform 200 could just store AR object attributes 244. Platform 200 can determine which of AR objects 242, if any, is of relevance to context 232 pertaining to a current environment or scene associated with the AR-capable device. In response, platform 200 can access an AR Object Addressing Agent (AOAA) 220, which can derive an address of the corresponding AR objects, possibly located on remote nodes.

AOAA 220 can derive an AR object address through numerous methods. In more simplistic embodiments, the AR object attributes 244 could include an address where the AR object 242 can be retrieved, assuming proper authentication or authorization. Such an approach is advantageous when memory requirements in platform 200 are more severe. Although the AOAA 220 is illustrated as being part of platform 200, the functionality of AOAA 220, or the object recognition engine 260, can be located within other devices, networking nodes, AR-capable devices (e.g., mobile phones, vehicles, etc.), or other components within the networking fabric.

Another approach by which AOAA 220 can derive an AR object address includes converting at least some of the attributes (e.g., environment attributes, derived attributes, target object attributes, context attributes, etc.) directly into an address within an address space. For example, derived attributes of the environment data can be quantified and converted into vector of attributes, possibly based on a standardized namespaces as discussed previously. The vector is run through a deterministic function, a hash function for example, to generate a hash value where the hash space represents the address space. The networking nodes, AR objects 242, contexts 232, or other items in the ecosystem can be assigned an address within the hash space. AR objects 242 can be stored on nodes having addresses that are close to the address of the AR objects. Once the address is generated, the networking node simply forwards a request for the AR object to a neighboring node having an address closer to the address of the AR object. An astute reader will recognize such addressing techniques as being similar to schemes used in peer-to-peer file sharing protocols. One aspect of the inventive subject matter is considered to including applying distributed addressing techniques to AR objects in a networking infrastructure environment.

Platform 200 can be configured to distinguish among augmented realities by applying different functions to generate an address. A first function, a hash or other type of function, could be used to derive a first portion of an address representing a specific augmented reality within the augment actuality. A second function can be applied to attributes to generate a specific AR object address. In some embodiments, the first portion could be prefix (e.g., a domain name, DOI prefix, etc.) while a second portion represents a suffix (e.g., a URL address, DOI suffix, etc.). Additional, the prefix, suffix, or other extension of an address can represent an address scheme associated with a context. In an embodiment using domain names, an address for an AR object might have the form "www.<augmented-reality address>.com/<context address>/<object address>" where each set of angle brackets ("< >") indicates a portion of a multi-portion AR object address.

Yet another approach for addressing could include converting environment attributes or other attributes into a network address where the AR object 242 is located. The attributes can be an index into a lookup table shared among networking nodes where the table has available AR objects 242 and their corresponding addresses. The network address could be a domain name or URL in a hash space as discuss above.

Regardless of the addressing scheme, AR object addresses generated by the AOAA 220 point to a location of a corresponding AR object 242 in one or more of the AR repositories 240, even when the objects or repositories are located external to hosting platform 200. As discussed above the AR object address can be derived directly, or indirectly, from a real-world object recognized as a target object, from context 232, or other elements carrying attribute information. Example AR object addresses can include a domain name, a URL, an IP address, a MAC address, a GUID, a hash value, or other type of address. In some embodiments, each AR object 242 can be assigned its own IP address (e.g., IPv4, IPv6, etc.) and can be directly addressed via one or more protocols (e.g., DNS, HTTP, FTP, SSL, SSH, etc.). For example, each AR object 242 could have its own IP address in an IPv6 environment or could have its own domain name and corresponding URLs. In such embodiments, AR objects 242 can be located through known techniques including name servers, DNS, or other address resolution techniques.

Although hosting platform 200 is illustrated as networking node or a server, one should appreciate that the functionality of hosting platform 200 as represented by its components can be integrated into AR-capable devices (e.g., mobile devices, tablets, cell phones, etc.). For examples an individual's cell phone can be configured with one or more modules (e.g., software instructions, hardware, etc.) offering capabilities of AOAA 220, object recognition engine 260, device interface 215, or other capabilities. In such an embodiment, device interface 215 can take on the form of a set of APIs through which the cell phone exchanges data with hosting platform 200 or its components. In still other embodiments, AR-capable device can share roles or responsibilities of hosting platform 200 with external devices. For example, a cell phone might utilize a local object recognition engine 260 to recognize easy to recognize objects (e.g., a face, money, bar code, etc.) while a digital representation of the scene is also transmitted to a more capable remote object recognition engine 260, which can recognize specific objects (e.g., a specific person's face, a context of a scene, etc.).

Element Interference

Figure 3:
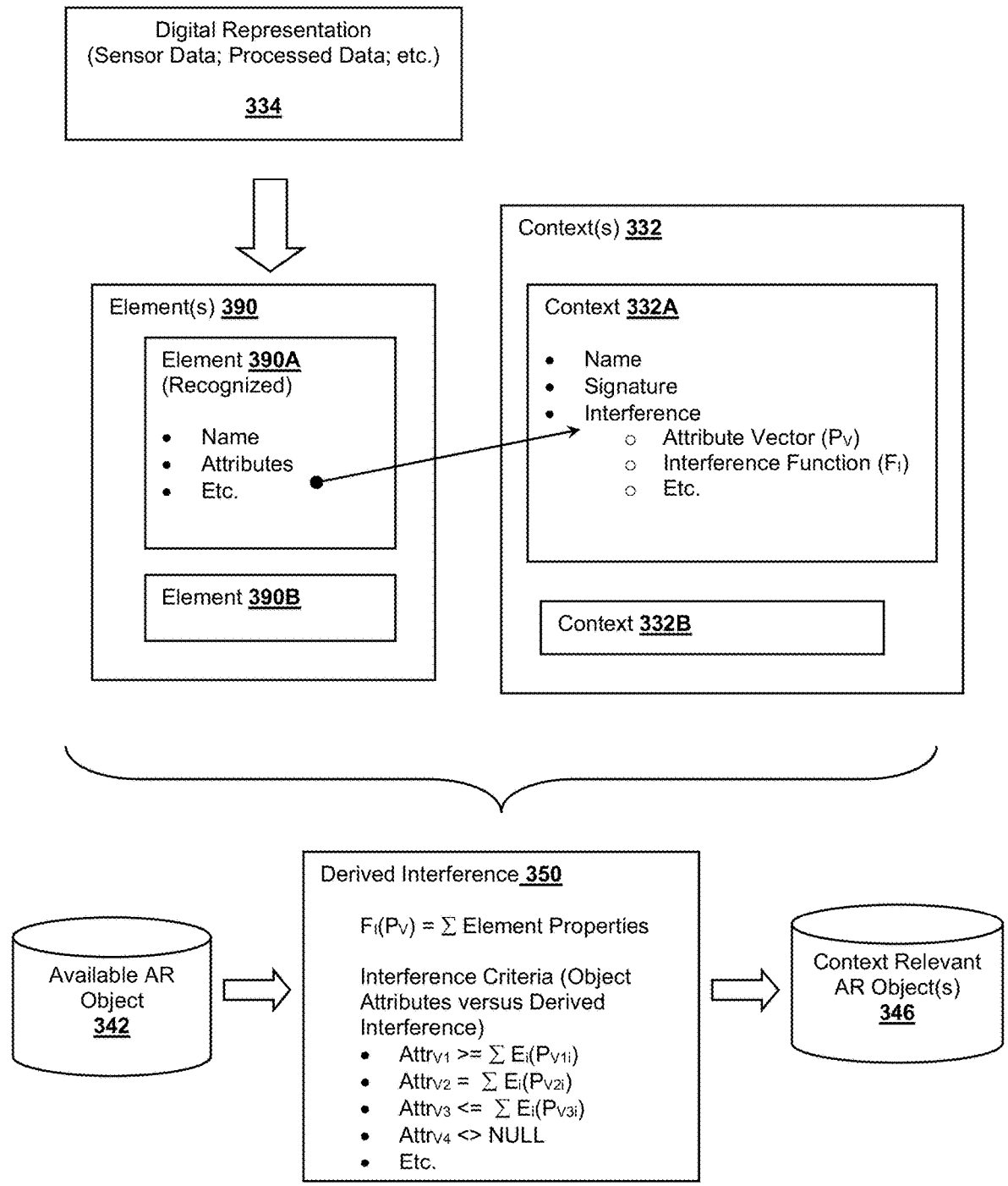
FIG. 3 illustrates a more detailed view of deriving interference among elements in a scene.

FIG. 3 outlines a flow of data illustrating interference among elements within a scene and how interference gives rise to an augmented reality experience. An AR hosting platform obtains digital representation 334, preferably via a device interface. Digital representation 334 comprises data representative of at least portions of a real-world scene. The real-world scene includes elements, which can include real-world elements or objects or even AR objects considered to be present. Digital representation 334 can be obtained from one or more remote devices or sensors able to capture scene-related data as discussed previously. Digital representation 334 can include raw sensor data, pre-processed data, post-processed data, or other forms of data depending on the analysis processing capabilities of the originating device.

The hosting platform analyzes digital representation 334 in an attempt to recognize one or more elements 390 within the scene as a target object. Recognized elements can include one or more individual elements as indicated by element 390A through element 390B. Recognizing elements 390 can include distinguishing between known target objects, identifying an object as a specific object (e.g., a car versus a specific car), interpreting an object (e.g., optical character recognition, logos, bar codes, symbols, etc.), or otherwise making a determination that an element 390 corresponds, at least to within some confidence level, a target object.

One should appreciate that the target object might not necessarily correspond to a specific element of the scene. For example, element 390A might represent a specific person's face, while the target object represents simply a generic face object. In some embodiments, element 390A can be recognized as more than one target object. To continue the previous example, element 390A could be recognized as a hierarchy of objects linked together: a human object, a male object, a face object, an eye object, an iris object, and an iris identification object, for example. With respect to FIG. 3, element 390A is considered to be a recognized target object.

Preferably the hosting platform recognizes at least one element in the scene, element 390A for example, as a target object. It is also contemplated that other elements 390 in the scene beyond real-world elements can also be recognized as target objects. For example, element 390B could be a virtual object whose image has been captured as part of digital representation 334. Element 390B could also be an object beyond human perception: radio waves, network traffic, network congestion, or other objects.

The hosting platform analyzes one or more of recognized elements 390 to determine a context 332 that pertains to the recognized target object. Multiple factors come into play when determining which of contexts 332 as represented by context 332A and 332B is most applicable to the scene. In the example shown, context 332A comprises an attribute signature indicating when context 332A would likely be considered applicable to a scene. Attributes of recognized elements 390A can be compared to the signature. If recognized elements 390A, alone or in aggregate, have attributes that sufficiently match the signature, the context 332A can be considered to pertain to at least the recognized target objects and to the scene as represented by digital representation 334. Although the example shown in FIG. 3 illustrates context 332A as the only context pertaining to the recognized element 390A, one should appreciate multiple contexts 332 could also pertain the recognized target objects or scene based on all information made available via digital representation 334.

Contexts 332 can be defined a priori as desired or automatically generated. A priori contexts 332 can be defined via a context definition interface (not shown) allowing an entity, possibly a AR object publisher, to define appropriate context. The entity can enter context attributes, signatures, or other information as desired to create a context object. The hosting platform can also be used to generate a context. For example, when digital representation 334 is analyzed and elements 390 are recognized, an individual can instruct the hosting platform to convert attributes of recognized elements 390A into a context signature.

Context 332A can further include an attribute vector, labeled as Pv, representing attributes or properties of scene elements 390 considered to be relevant to the context with respect to determining interference among elements 390, recognized or un-recognized. To some readers, the attribute vector might be a subtle point and should not be confused with the context attribute signature. Rather, the attribute vector comprises a data structure of relevant attributes that elements 390 should have to create an interference among the elements. Thus, the attribute vector can be considered element selection criteria for deriving an interference. One should keep in mind that a recognized element 390A might contribute to satisfaction of a context signature but might not align with the context's attribute vector. For example, a person might be recognized as a target object representing a player in an AR game. The person could contribute to determine which gaming context pertains to the person or the scene. However, the player might not be required to determine interference among other gaming objects within the scene.

Context attribute vectors can also align within one or more normalized or standardized namespaces. Each member of the vector can include an attribute name and possibly values. Thus attributes can be considered be a multi-valued object. It is considered advantageous to utilize a common namespace to allow for easy mapping between elements and contexts, as well as other generic objects within the contemplated system.

Context 332A can further include an interference function, labeled as $F_I$, representing a quantified description of how elements 390 of a scene interfere with each other with respect to one more element attributes to enhance or suppress the presence of AR objects in the scene. The interference function preferably is function of the attribute vector and of the available AR objects 342. Available AR objects 324 represent AR objects considered to be valid participates of the scene as well as considered to be valid participants associated with context 332. Available AR objects 342 can be identified as discussed previously, possibly through comparison of the object attributes of AR objects 324 to context attributes of context 332.

Element attributes, AR object attributes, or other attributes that contribute to interference can include myriad types of attributes. To extend the metaphor of interference of electromagnetic waves further, interference of the waves depends on various factors (e.g., amplitude, phase, frequency, etc.) at a point in space. In more preferred embodiments, elements 390 can also give rise to interference based on locations. For example, digital representation 334 can comprises location information (e.g., relative location to elements 390 of a scene, triangulation, GPS coordinates, etc.) where the interference function can depend on location. More specifically, the location information can pertain to or reflect the physical location of real-world elements. Further the interference among elements 390 can also depend on time where digital representation 334 comprises time information associated with elements 390 or the scene in general.

The interference function can be used to generate derived interference 350. Derived interference 350 can be considered an auto-generated interference criteria used to determine which of the available AR objects 342 are context relevant AR objects 346 and to what extent context relevant AR objects 346 should have a presence in an augmented reality experience based on interference among the elements 390. Derived interference 350 can be considered to represent interference criteria derived from element properties (i.e., attribute values) of elements 390. The context relevant AR objects 346 are members of the set of AR objects that satisfy the interference criteria. In the example shown, the interference function is characterized as a sum of element properties in a similar fashion as electronic magnetic wave interference can be calculated by summing amplitude taking into account various properties (e.g., phase, time, location, frequency, etc.). In the simplistic example presented, the interference criteria are derived on an attribute-by-attribute basis by summing over the values over corresponding attributes of scene elements 390. For example, a first criterion for a first attribute can be derived from a sum of the corresponding attribute values from all elements. If one of available AR objects 342 has attribute values satisfying the interference criteria, it is considered to be a member of the set of context relevant AR objects 346.

Although the example of derived interference 350 is based on a simple sum, it is contemplated the interference function can be arbitrarily complex. Preferably, the resulting interference function yields an object satisfaction level with respect to the interference criteria. The satisfaction level indicates to what degree each of relevant AR objects 346 has a presence in the augmented reality. A satisfaction level can be calculated according to a desired algorithm to properly reflect the utility of context 332A. For example, a satisfaction level can be based on several factors, possibly including a number of interference criterion met (e.g., requirements, optional condition, etc.), a normalized measure of how far object attributes exceed or fall below criteria thresholds, or other algorithms. The satisfaction level can be used to instruct a remote AR-capable device on how to interact with relevant AR objects 346.

The above description is written from the perspective that elements within a scene interfere with each other to influence possible interactions with relevant AR objects 346. One should appreciate that the interference can be derived based on all recognized elements 390A of the scene, a portion of the elements recognized in the scene, or even a single element recognized within the scene. Furthermore, the elements can include the relevant AR objects 346 with which an individual can interact. Therefore, relevant AR objects 346 can contribute to the interference and affect their own presence much in the same way two interfering electromagnetic waves give rise to their combined effect (e.g., interference patterns, amplitudes, etc.).

An astute reader will appreciate that a current circumstance in a scene can change quite rapidly with time, which can be reflected in digital representation 334. As digital representation 334 changes in time, including in real-time, contexts 332 can also change in time. Changes in contexts 332 cause derived interference 350 to change in time, which in turn can change the set of relevant AR objects 346 in time. Such changes can be propagated back to remote AR-capable devices. In some embodiments, relevant AR objects 346 can have some level of temporal persistence to ensure smooth transitions from one context state to another. For example, relevant AR objects 346 might be presented and remains present even after its corresponding context 332 is no longer relevant. Additionally, a context 332 might have to remain relevant for a certain period of time before relevant AR objects 346 are presented. Such an approach is advantageous for usability.

Although the above discussion describes generating derived interference 350 based on contexts 332, one should also note derived interference 350 can depend on changes between or among contexts 332. As scene changes with time, contexts 332 can ebb or flow, or even shift focus (e.g., a primary context, secondary context, tertiary context, etc.) from a first context to a second context. On aspect of the inventive subject matter is considered to include configuring AR-capable devices to allow interactions with context relevant AR objects 346 based on changes between contexts 332, preferably as determined by derived interference 350 spawned from such context changes. For example, an individual can participate within an augmented reality experience associated with a gaming context. If they chose to purchase a product, the augmented reality experience can incorporate a shopping context. Derived interference 350 can be adjusted based on the shift in focus from a specific gaming context to a shopping context to provide additional AR content to the individual. Alternatively, a shift in focus from a gaming context to a traveling context might not affect the individual's augmented reality experience. One should note a shift in focus could include retaining a previously identified context 332 without discarding them in favor a new context 332. A context focus can be measured according to what degree a context 332 pertains to a scene, possibly relevant to other contexts 332.

Interference-Based Presentation

Figure 4:
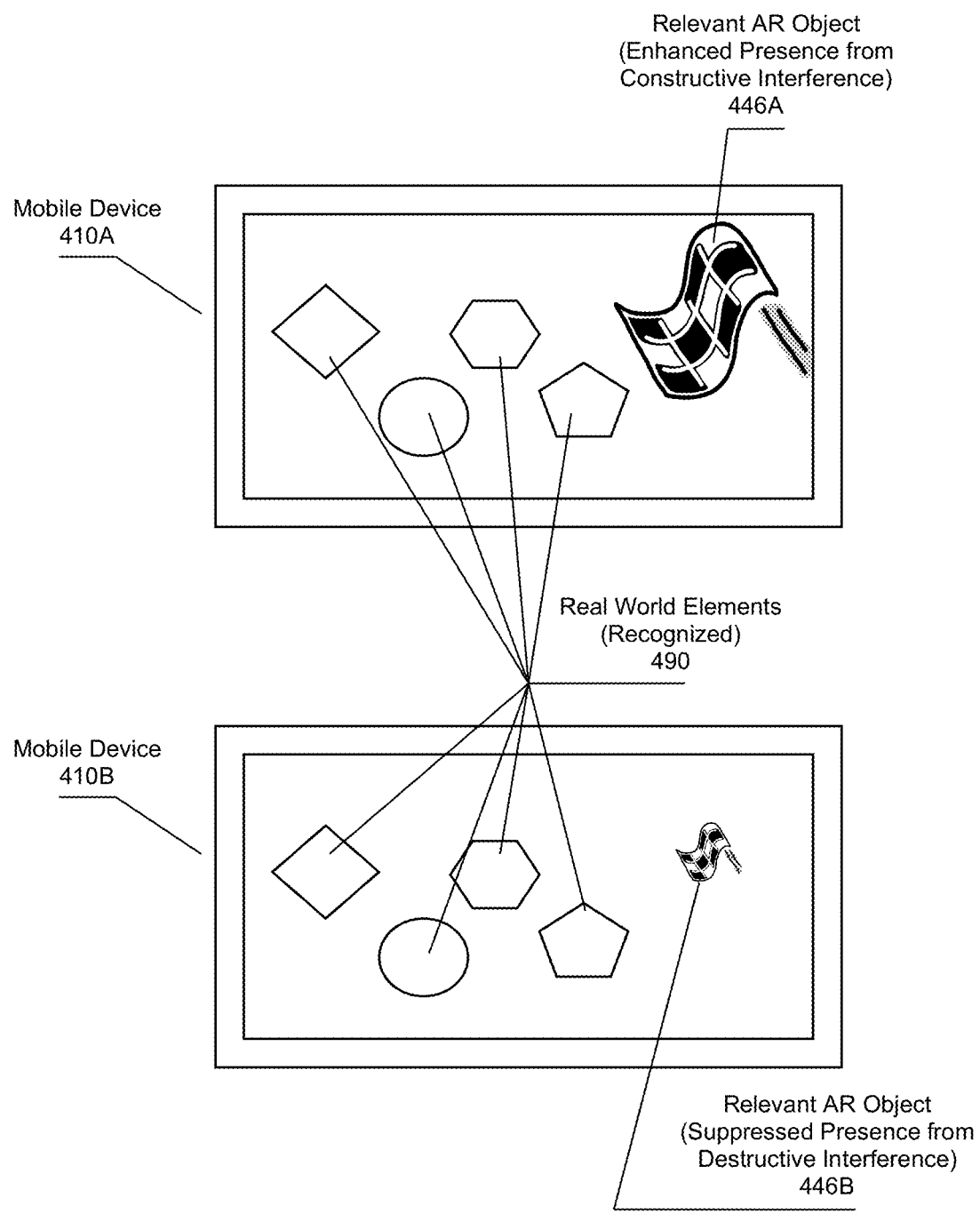
FIG. 4 provides examples of presenting augmented reality object based on constructive or destructive interference.

FIG. 4 illustrates how a satisfaction level can effect presentation or interaction on AR-capable devices represented by mobile devices 410A and 410B. Mobile devices 410A and 410B both capture a digital representation of a scene having real world elements 490. In this example, an AR hosting platform recognizes the elements 490 and identifies a set of relevant AR objects from available AR objects considered germane to a context associated with the elements 490. Relevant AR objects 446A and 446B are considered member objects of the set of relevant AR objects.

The AR hosting platform generates a derived interference based on elements 490 to determine how they constructively or destructively interference with respect to a context. In the case of mobile device 410A, relevant AR object 446A has an enhanced presence due to constructive interference among elements 490. Thus, relevant AR object 446A is strongly influenced by the constructive interference among elements 490 and likely has a strong satisfaction level with respect to interference criteria. In the example of mobile device 410B, which captures a similar digital representation of the scene having elements 490, the context dictates that relevant AR object 446B has a suppressed presence due to destructive interference among elements 490. Thus, relevant AR object 446B is weakly, or negatively, influenced by elements 490 and likely has a weak or negative satisfaction level with respect to the interference criteria.

One should note that relevant AR object 446B could even be relevant AR object 446A. However, the mobile devices provide different augmented reality experiences based on the difference in relative satisfaction levels. One reason, among many, for such a difference could be based on user identification of the mobile devices where the user's identification information is incorporated into the digital representation of the scene altering the contexts.

Enhanced presence and suppressed presence can take many different forms depending on the nature of relevant AR objects 446A and 446B, the context, or other factors relating to the scene. At a most basic level, presence could simply mean relevant AR objects are present (enhanced) or not present (suppressed). Still, presence can cover a full spectrum of experiences. Consider a visual image of relevant AR object 446A. The visual image can be superimposed over an image of the scene where the visual image is opaque and covers images of elements 490. However, the visual image of relevant AR object 446B might have shades of transparency to indicate a suppressed presence. Similarly when relevant AR objects 446A and 446B have audio content, the audio can be played according to volume levels derived from each objects interference criteria satisfaction level. It is contemplated that presence can be enhanced or suppressed for all human sense modalities, naturally depending on the presentation capabilities of the AR-capable devices.

Presence can also extend beyond human sense modalities. Enhanced or suppressed presence can also affect functionality associated with relevant AR objects 446A or 446B. When mobile devices 410A and 410B are instructed to allow an interaction with relevant AR objects 446A or 446B, the interactions can be restricted or allowed based on the satisfaction level. For example, specific features of relevant AR objects 446A might be turned on or made available while features of relevant AR object 446B might be turned off or otherwise made unavailable.

Use Case: Gaming and Promotion Contexts

Figure 5:
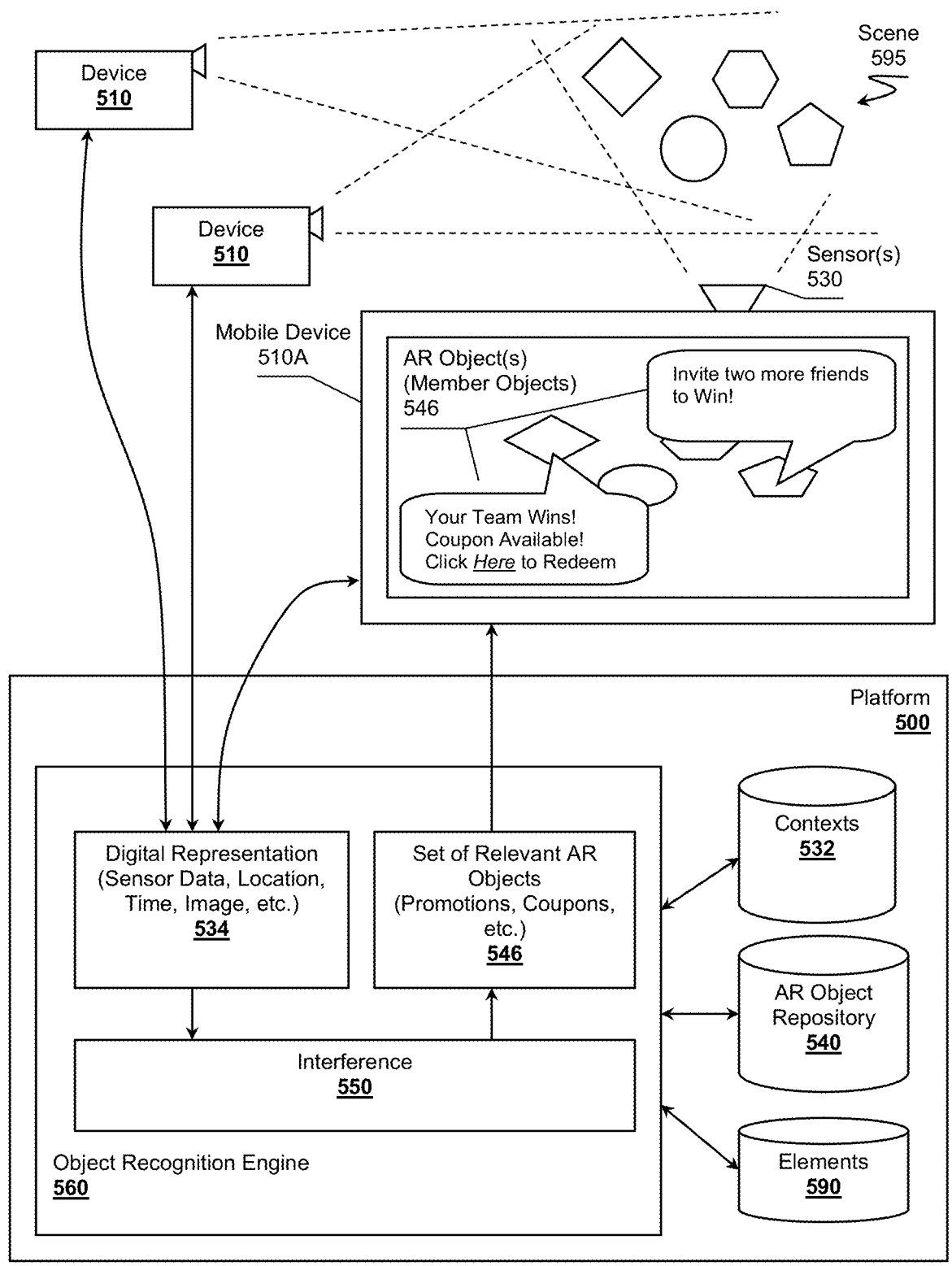
FIG. 5 is an overview of a use case of interacting with relevant augmented reality objects based on interference within a context involving multiple participants.

FIG. 5 illustrates a possible use case for the disclosed inventive subject matter with respect to combining gaming and advertising. In the example, multiple individuals use their cell phones operating as mobile devices 510 to compete for promotions associated with products in a store. Mobile devices 510 each capture data associated with scene 595, which includes products in the store. Each device submits their own respective digital representation 534, possibly captured by their own sensors 530, of scene 595 to hosting platform 500. It should be noted that digital representation(s) 534 can include images of the products, mobile device information (e.g., device identify, location, orientation, position, etc.), user identification, or other information. Object recognition engine 560 analyzes digital representation 534 to recognize the products in the store as target objects as represented by elements 590. In this example, elements 590 are known target objects corresponding to the store's products. Object recognition engine 560 derives interference 550 from contexts 532 that pertain to scene 595. Contexts 532 could include a shopping context, a store-specific context, a gaming context, or other contexts pertaining to circumstances of scene 595. Object recognition engine 560 utilizes interference 550 to identify a set of relevant AR objects 546 from available AR objects in AR object repository 540. Platform 500 configures mobile device 510A to allow device 510A to have an interaction with one or more member AR objects 546A from the set.

The example of FIG. 5 contemplates an augmented reality where individuals participate together, possibly as a team, to form the augmented reality around them for commercial purposes. As the number of related individuals, friends or acquaintances, converge on the store, their presence constructively interferes to give rise to one or more promotions (e.g., sales, coupons, prizes, incentives, discounts, etc.). Individuals that are members of an opposing team can suppress the presence of the promotions available to the first team while enhancing the presence of the same promotions for their own team. As shown, mobile device 510A is a member of a team that has won a coupon with respect to a product. However, the team still lacks sufficient members local to scene 595 to win another promotion for a second product so they are requested to invite additional friends. In the case of the second product, the AR object message bubble has a suppressed presence (i.e., lacking access to a promotion) due to interference generated due to opposing team members.

For the simplified case of FIG. 5, interference 550 can be characterized by a relative sum of team members: Number of Team A members minus Number of Team B members. When the value is heavily positive, Team A is wining. When the values is heavily negative, team B is winning. Platform 500 compares AR object attributes related to number of team members and instructs mobile device 510A to allow interactions with AR objects 546A according to interference 550 as determined from each object's interference criteria satisfaction level. As team members arrive or leave a scene the presence of AR objects 546A can change accordingly.

The gaming and promotion use case is just one example of context derivation and interference. Another similar example could include a medical context where presence of medical equipment (e.g., X-Ray, MRI, dentist chair, etc.), a patient, and a doctor dictate which AR medical objects should be made available. For example, a patient can enter a doctor's office with a doctor present where the doctor utilizes a tablet or pad based computing device (e.g., iPad™, Xoom™, PlayBook™ etc.). When the doctor and patient are alone, their presence constructively interferes to allow full interaction with the patient's AR-based medical records on the pad. When the doctor and patient are in the presence of others, the individuals destructively interfere causing restricted interactions with the AR-based medical records.

Use Case: Object-Based Message Boards

Figure 6:
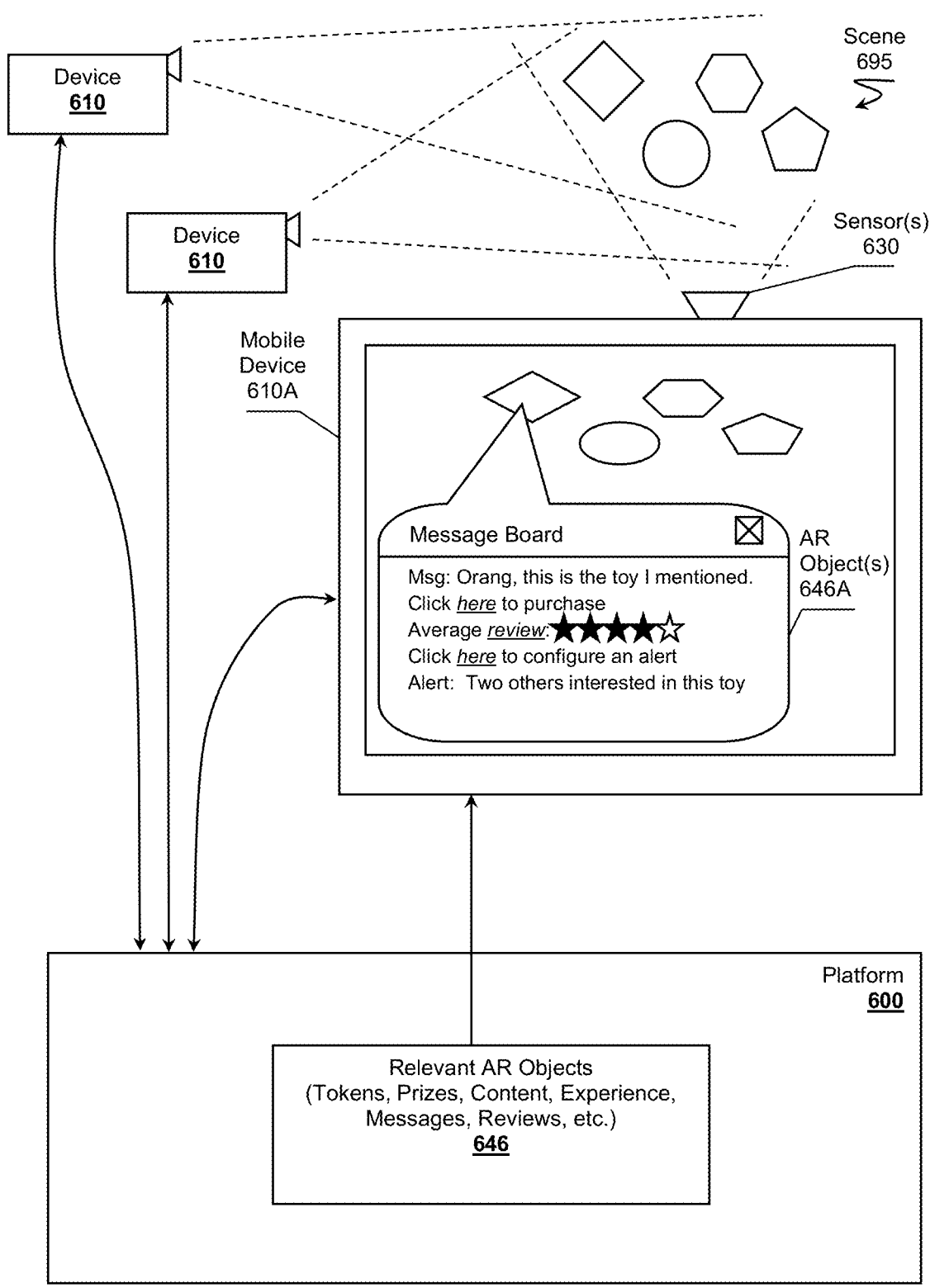
FIG. 6 an overview of a use case of interacting with relevant augmented reality objects based on interference within a context of a message board.

FIG. 6 illustrates another possible use case where hosting platform 600 provides for annotation of specific objects in scene 695. One or more individuals can use mobile devices 610 to capture a digital representation of scene 695 via sensors 630. The scene includes multiple objects as indicated by the geometric shapes. Platform 600 attempts to recognize the objects and the context associated with the objects or scene 695. Platform 600 then identifies relevant AR objects 646 that are bound to the objects. AR object 646A represents a message board having messages where the board and messages are bound to the identified specific object as AR objects. One should note the messages can also be bound to the message board object rather than just the specific object.

One should appreciate that the messages presented in the message board are made available based on context of scene 695 and interference among elements of the scene. For example, a personal message has been bound to the real world object for the owner of mobile device 610A. The personal message is presented due to the presence of the device owner and the object together, thus constructively interfering causing presentation of the personal message. Additionally, the message board lists other messages that target the general public. One should appreciate that individuals can use their mobile devices, or other AR-capable devices, to interact with AR objects 646A via a message exchange, even where AR object 646A represents a message bound to a real-world element. Although AR objects 646A are presented as messages or a message board bound to a specific element recognized as a specific target object, As discussed previously AR objects 646 can include purchasable products, promotions (e.g., coupons, prizes, incentives, sales, discounts, etc.), content (e.g., images, video, audio, etc.), a reward based on an achievement, a token, a clue to a puzzle or game, an unlocked augmented reality experience, application data, reviews, or other type of objects or content.

Interactions

Once the AR hosting platform identifies the set of relevant AR objects for a context, the hosting platform instructs the mobile device, or other AR capable device, to allow the device to have one or more interactions with the AR objects. In some embodiments, the AR objects can include hyperlinked AR objects allowing a user to select or click a presented object, which causes the device to access additional information over the network. In more elaborate embodiments, the AR objects can include software instructions that are copied to a tangible memory of the mobile device. The instructions configure the mobile device to interact with the AR object or remote computing devices according to the instructions. Interactions can include a wide range of possible interplay between or among the AR-capable devices and AR objects.

One especially interesting interaction includes allowing the AR-capable device to participate in a commercial transaction with a commerce engine. The commercial transaction can include purchasing, selecting, or otherwise monetizing interactions with member objects of the set of relevant AR objects. Conducting a commercial transaction can include interaction with one or more on-line accounts over a network. In such embodiments, the AR objects of interest can carry instructions or other types of information to allow the device to interact with remote servers to complete a transaction. Such an approach eliminates a requirement of the device to have a priori knowledge of financial protocols to complete the transaction. Additional examples of commercial transactions can include interacting with frequent flyer mile programs; exchanging virtual currency in an on-line world; transferring funds, real or virtual, from one account to another; paying tolls; interacting with a point-of-sales device; conducting a credit card, gift card, or loyalty card transaction; making on-line purchases via an on-line retailer (e.g., Amazon™, Audible™, etc.); paying utilities; paying taxes; or other types of interactions considered to have monetary value.

Yet another contemplated type of interaction includes managing AR objects. In more typical embodiments, individuals with cell phones would likely represent consumers of AR content. AR content consumers have a broad set of needs to manage AR objects. In some embodiments, an individual's cell phone can operate as an AR object hub through which the individual can interact with other nearby cell phone's participating within an overlapping augmented reality experience. A cell phone, or other AR-capable device, can also operate as a storage facility or virtual brief case for more permanent AR objects bound to the individual or cell phone. Management is also considered to include monitoring use of AR objects, assuming proper authentication or authorization with respect to the AR objects; establishing alerts or notifications; inventorying AR objects or capabilities; logging use of AR objects, transporting AR objects from one physical location to another; exchanging or trading AR objects with others; viewing or observing contexts; or other types of management related interactions.

Management interactions can also apply to augmented reality content creators or publishers. Interactions can also comprise allowing AR-capable devices to operate as a content creation utility. Publishers can utilize AR-capable devices, even their own cell phones, to interact with AR objects including creating AR objects in real-time from elements within a scene; populating a scene with AR objects; defining or creating AR contexts even based on elements of a scene; managing revisions or versions of AR objects; debugging AR objects during creation or even in the field; publishing or releasing one or more AR objects for consumption; binding AR objects to other AR objects or to real-world elements; establishing interferences functions for contexts or scenes; or otherwise participating in creating or managing AR content.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An augmented reality (AR) object management system comprising:
   an AR repository comprising at least one database of AR objects having one or more location attributes, wherein at least some of the AR objects represent one or more AR experiences;
   at least one computer readable memory storing software instructions; and
   at least one processor coupled with the AR repository and the at least one computer readable memory, and that performs the following operations upon execution of the software instructions:
      obtaining a digital representation of a scene including at least a device location of an AR capable device;
      determining a scene-based context related to the AR capable device and the scene based at least on the device location;
      identifying a set of available AR objects that may populate the scene from the AR repository wherein the set of available AR objects is germane to the scene-based context and based on the AR objects' location attributes and the device location;
      unlocking presence of at least one AR object in the set of available AR objects that may populate the scene as the one or more AR experiences based on at least a proximity of the at least one AR object to the AR capable device; and
      causing the AR capable device to render the at least one AR object as the one or more AR experiences according to the unlocked presence.

2. The system of claim 1, wherein the at least one AR object comprises a purchasable object.

3. The system of claim 2, wherein the one or more AR experiences comprise purchasable objects.

4. The system of claim 1, wherein the one or more AR experiences comprise at least one of the following: an image, a video, game content, and audio content.

5. The system of claim 1, wherein the at least one AR object represents an augmented aspect of the scene.

6. The system of claim 1, wherein the operations further include exchanging of virtual currency with respect to the at least one AR object.

7. The system of claim 1, wherein the operations further include enabling the AR capable device to access additional information related to the rendered unlocked AR experiences via a user selecting at least one of the rendered at least some of the AR objects.

8. The system of claim 1, wherein the unlocked presence comprises a degree of presence.

9. The system of claim 1, wherein the presence is unlocked based on a period of time for the at least one AR object to be available.

10. The system of claim 4, wherein the at least one AR object comprises real-time content.

11. The system of claim 10, wherein the real-time content comprises the one or more AR experiences.

12. The system of claim 1, wherein the AR capable device comprises at least a portion of the AR repository.

13. The system of claim 1, wherein the at least one AR object is rendered relative to the scene.

14. The system of claim 1, wherein the at least one AR object is rendered within an AR game.

15. The system of claim 1, wherein the at least one AR object is rendered on a display by superimposing a digital image of the at least one AR object over the digital representation of the scene.

16. The system of claim 1, wherein the at least one AR object is rendered on a display within an overlapping augmented reality among multiple AR capable mobile devices.

17. The system of claim 16, wherein the overlapping augmented reality comprises a team-based augmented reality.

18. The system of claim 1, wherein the location attributes relate to GPS coordinates.

19. The system of claim 1, wherein the scene comprises virtual elements and real-world elements.

20. A method of populating one or more augmented reality (AR) objects in an AR object management system comprising an AR repository comprising at least one database of AR objects having one or more location attributes, wherein at least some of the AR objects represent one or more AR experiences, the method comprising:

obtaining a digital representation of a scene including at least a device location of an AR capable device;
determining a scene-based context related to the AR capable device and the scene based at least on the device location;
identifying a set of available AR objects that may populate the scene from the AR repository wherein the set of available AR objects is germane to the scene-based context and based on the AR objects' location attributes and the device location;
unlocking presence of at least one AR object in the set of available AR objects that may populate the scene as the one or more AR experiences based on at least a proximity of the at least one AR object to the AR capable device; and
causing the AR capable device to render the at least one AR object as the one or more AR experiences according to the unlocked presence.

21. A non-transitory computer-readable medium comprising at least one computer readable memory storing one or more software instructions which, upon execution by a processor, perform:
obtaining a digital representation of a scene including at least a device location of an AR capable device;
determining a scene-based context related to the AR capable device and the scene based at least on the device location;
identifying a set of available AR objects that may populate the scene from an AR repository comprising at least one database of AR objects having one or more location attributes wherein at least some of the AR objects represent one or more AR experiences, wherein the identified set of available AR objects is germane to the scene-based context and based on the AR objects' location attributes and the device location;
unlocking presence of at least one AR object in the set of available AR objects that may populate the scene as the one or more AR experiences based on at least a proximity of the at least one AR object to the AR capable device; and
causing the AR capable device to render the at least one AR object as the one or more AR experiences according to the unlocked presence.

* * * * *